(12) United States Patent
Lin

(10) Patent No.: US 7,375,491 B2
(45) Date of Patent: May 20, 2008

(54) BATTERY CHARGE CIRCUIT WITH MULTI-CHARGE STAGE AND METHOD THEREOF

(75) Inventor: Sheng-Chan Lin, Taipei (TW)

(73) Assignee: Sunjett Corporation, Taipei (TW)

( * ) Notice: Subject to any disclaimer, the term of this patent is extended or adjusted under 35 U.S.C. 154(b) by 0 days.

(21) Appl. No.: 11/304,730

(22) Filed: Dec. 16, 2005

(65) Prior Publication Data

US 2007/0139011 A1    Jun. 21, 2007

(51) Int. Cl.
*H02J 7/00* (2006.01)
*H02J 7/02* (2006.01)

(52) U.S. Cl. ............... 320/107; 320/109; 320/110; 320/111; 320/112; 320/113; 320/114; 320/115

(58) Field of Classification Search ........ 320/141–146, 320/107–115
See application file for complete search history.

(56) References Cited

U.S. PATENT DOCUMENTS

| | | | | |
|---|---|---|---|---|
| 4,307,330 A | * | 12/1981 | Belot | 320/134 |
| 5,345,162 A | * | 9/1994 | Shiojima | 320/164 |
| 5,670,863 A | * | 9/1997 | Broell et al. | 320/145 |
| 5,998,968 A | * | 12/1999 | Pittman et al. | 320/130 |
| 6,181,103 B1 | * | 1/2001 | Chen | 320/106 |
| 6,252,373 B1 | | 6/2001 | Stefansson et al. | |
| 6,304,060 B1 | | 10/2001 | Dernehl | |
| 6,456,046 B1 | | 9/2002 | Gaza | |
| 6,611,129 B2 | | 8/2003 | Bucur | |
| 6,753,671 B1 | | 6/2004 | Harvey | |
| 6,754,527 B2 | * | 6/2004 | Stroebel et al. | 607/5 |
| 6,762,584 B2 | | 7/2004 | Harvey | |
| 6,822,425 B2 | | 11/2004 | Krieger et al. | |
| 2003/0045906 A1 | * | 3/2003 | Stroebel et al. | 607/5 |
| 2003/0111979 A1 | | 6/2003 | Cheiky et al. | |
| 2004/0012375 A1 | | 1/2004 | Bucur | |
| 2004/0113585 A1 | | 6/2004 | Stanesti et al. | |
| 2004/0178772 A1 | | 9/2004 | Cheiky et al. | |
| 2004/0217738 A1 | | 11/2004 | Cheiky et al. | |
| 2004/0239290 A1 | | 12/2004 | Krieger | |
| 2005/0007072 A1 | | 1/2005 | Krieger et al. | |
| 2005/0088144 A1 | | 4/2005 | Pacholok et al. | |

FOREIGN PATENT DOCUMENTS

WO    WO 03/055033 A1 *    7/2003

\* cited by examiner

*Primary Examiner*—Matthew V. Nguyen
*Assistant Examiner*—Jue Zhang
(74) *Attorney, Agent, or Firm*—Rabin & Berdo, P.C.

(57) ABSTRACT

A charge circuit having multi charge stages for charging at least one battery includes: a first current generating circuit for generating a first charge power having a first charge current in pulse form with a first frequency and a first charge voltage to charge the at least one battery; a voltage generating circuit connected to the first current generating circuit for controlling the first charge power having a first charge current in pulse form with a first frequency and a first charge voltage; a voltage control circuit connected to the voltage generating circuit for generating a first constant voltage and/or a second constant voltage; and a second current generating circuit connected to the voltage generating circuit for generating a variant power comprising a variant current in pulse form with a second frequency wherein a charge voltage included in the variant power varies with the second frequency.

22 Claims, 22 Drawing Sheets

BATTERY CHARGE CIRCUIT WITH MULTI-CHARGE STAGE AND METHOD THEREOF

BACKGROUND

1. Field of the Invention

The invention relates to a charge circuit/method and in particular to a charge circuit/method using charge current and voltage in pulses to charge batteries.

2. Related Art

Batteries of all shapes and sizes, available in sealed and maintenance-free products, are mass-produced today. Batteries are commonly used to provide a direct-current (dc) source of electrical energy in a wide variety of applications.

Battery charging is accomplished through delivery of an external power source to a battery, thereby ionizing the plates to opposing potentials (voltages or electrical pressures) and reversing the electrochemical process that occurs when the battery is used to supply energy to a load. Refer to FIG. 1 depicting a charge topology of half constant current. The voltage in the battery increases with time, while the charge current decreases gradually. Refer to FIG. 2 depicting a charge topology of constant current. In FIG. 2, the charge current remains constant during the whole charge.

Refer to FIG. 3 depicting a charge topology of constant current and current voltage. The topology in FIG. 3 is a multi-stage charge method, which may reduce the charge time. A multi-stage charger first applies a constant current charge, raising the cell voltage to a preset voltage. The battery is charged to such as 70% in stage 1. During the topping charge in stage 2 that follows, the charge current is gradually reduced as the cell is being saturated.

The charge method illustrated in FIG. 1~3 may not fully charge the energy into the batteries. Further, the constant charge current in the conventional charge method is difficult to deliver into the battery continuously. For other batteries, like silicone power battery, the internal resistance of these batteries increases with the usage. Thus, charge energy into the batteries becomes more and more difficult. Besides, the ageing of batteries also arise difficulty of charge.

For some large capacity batteries, charge and discharge of the power source to and from batteries is done by chemical reaction. Some production is generated during the chemical reaction process. In these batteries, lead-acid batteries may be assembled to provide the greatest energy density, and have the longest life cycle. In lead acid batteries, the reaction of lead and lead oxide with the sulfuric acid electrolyte produces a voltage. The supplying of energy to and external resistance discharges the battery. Lead Sulfate is generated in the charge and discharge process for lead acid batteries. Lead Sulfate not only results in unfull charge of the batteries, but also decrease of life-span.

SUMMARY

Accordingly, a battery charge circuit and method thereof are provided. Features and advantages of the provided battery charge circuit and method thereof will be set forth in the description which follows, and in part will be apparent from the description, or may be learned by practice of the invention. The objectives and other advantages of the invention will be realized and attained by the method and apparatus particularly pointed out in the written description and claims of the present application, as well as the appended drawings.

As embodied and broadly described, a charge circuit having multi charge stages for charging at least one battery includes: a first current generating circuit for generating a first charge power having a first charge current in pulse form with a first frequency and a first charge voltage to charge the at least one battery, wherein the first charge current in the first charge stage remains substantially constant, the first charge voltage remains a first constant voltage; a voltage generating circuit connected to the first current generating circuit for controlling the first charge power having a first charge current in pulse form with a first frequency and a first charge voltage; a voltage control circuit connected to the voltage generating circuit for generating a first constant voltage and/or a second constant voltage; and a second current generating circuit connected to the voltage generating circuit for generating a variant power comprising a variant current in pulse form with a second frequency wherein a charge voltage included in the variant power varies with the second frequency.

According to the embodiments, using pulses to charge batteries may reduce generation of the lead sulfate during the charge. Therefore, batteries may have full charge and the life-span increases.

According to the embodiments, the charge current in pulse form may be applied to the batteries for maintenance after charging batteries. The low temperature causes batteries capacity to decrease in cool or cold region. The pulses provided after charging prevents the capacity decrease. Therefore, extra apparatuses or electrical maintenance devices for maintenance after charge is not necessary.

According to the embodiments, there are multi charge stages. The stage is adjustable according the charge state of the batteries. The charge efficiency is improved and time saving.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

BRIEF DESCRIPTION OF THE DRAWINGS

The above and other objects, features and other advantages of the invention will be more clearly understood from the following detailed description when taken in conjunction with the accompanying drawings, in which:

FIG. 12 illustrates the process when the charge system is turned on.

DETAILED DESCRIPTION

Figure 1:
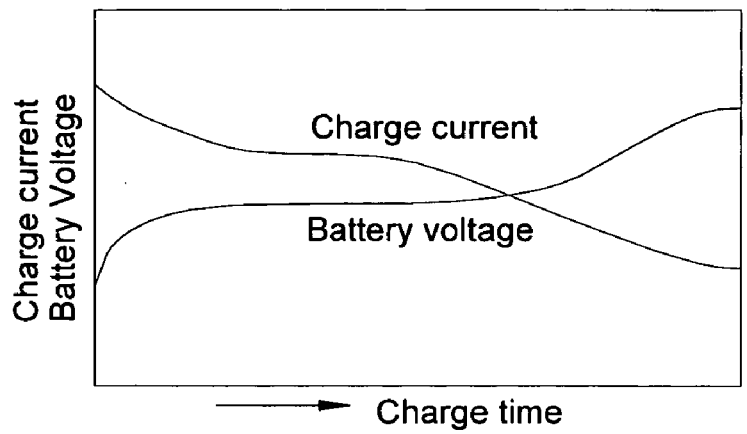
FIG. 1 illustrates a charge topology of the prior art.
Figure 2:
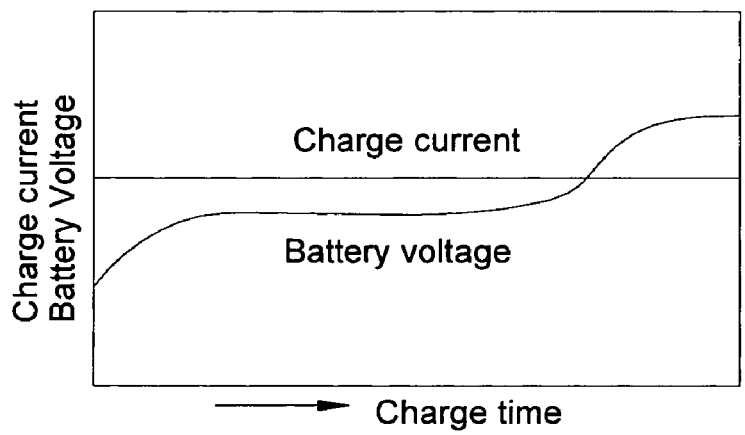
FIG. 2 illustrates another charge topology of the prior art.
Figure 3:
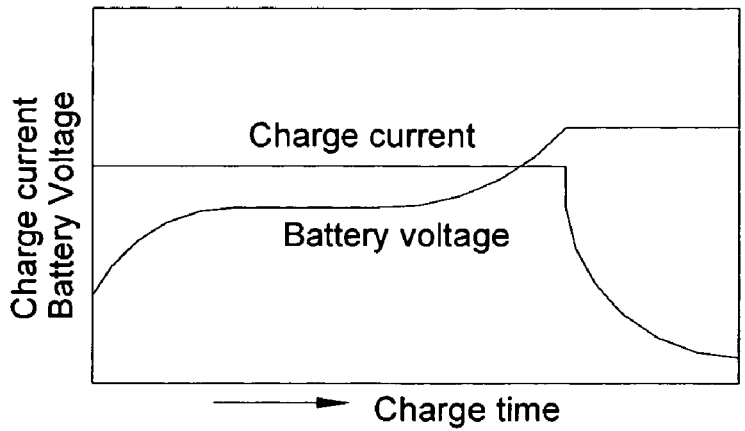
FIG. 3 illustrates another charge topology of the prior art.

Reference will now be made in greater detail to an embodiment of the invention, an example of which is illustrated in the accompanying drawings. Wherever possible, the same reference numerals are used throughout the drawings and the description to refer to the same or like parts.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 4:
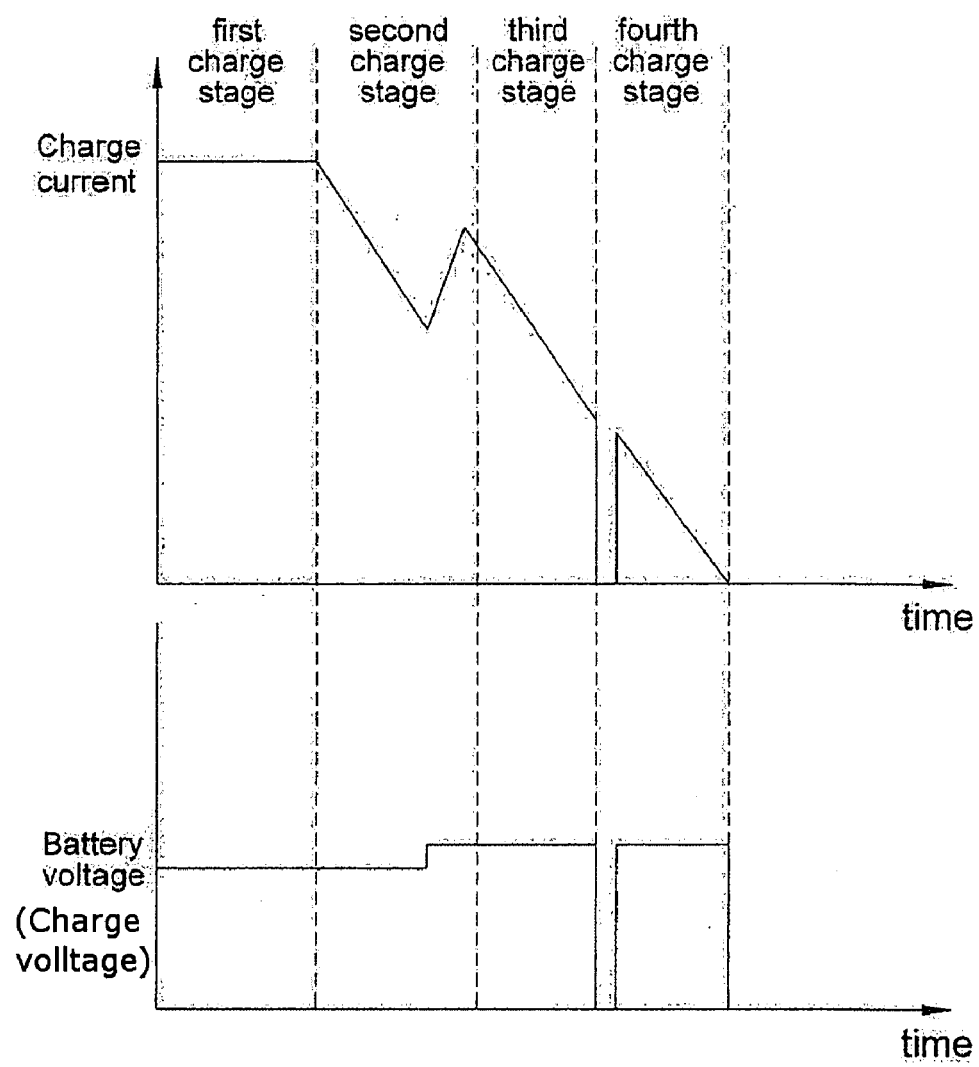
FIG. 4 illustrates an embodiment in accordance with the charge topology of the invention.

FIG. 4 illustrates a charge topology of the invention. In FIG. 4, a multi charge stage charge topology is employed. The main charge stages are the first charge stage, the second charge stage, the third charge stage, and the fourth charge stage respectively. In the embodiment, in the first charge stage, constant current mode is employed. In the following charge stages after the first charge stage, constant voltage mode is employed. It should be noted that the term "battery voltage" in FIG. 4 (and other drawings) refers to the charge voltage (that is, the charging voltage), and FIG. 4 (but not the other drawings) employs both terms.

In the first charge stage, a first charge power having a first charge current in pulse form with a first frequency, for example 100 Hz to 120 Hz, and a first charge voltage is applied to charge the at least one battery. The first charge current in the first charge stage remains substantially constant; the first charge voltage remains a first constant voltage CV1. Accordingly, the first charge stage is constant current mode. For per batter cell, the first constant voltage CV1 may be 2.25 to 2.36 volts.

In the second charge stage following the first charge stage, a second power having a second charge current in pulse form with the first frequency and a second charge voltage is applied to charge the at least one battery. The second charge current in the second charge stage decreases gradually. The second charge voltage remains the first constant voltage CV1. As illustrated in the figure, the starting current of the second charge current in the second charge stage is lower than the first charge current.

In the third charge stage following the second charge stage, a third charge power having a third charge current in pulse form with the first frequency and a third charge voltage to charge the at least one battery. The third current in the third charge stage decreases gradually, the third charge voltage remains a second constant voltage CV2 is higher than the first constant voltage CV1 in the second charge stage. The starting current of the third charge current is higher than the ending current of the second charge stage and lower than the first charge current. For per batter cell, the second constant voltage CV2 may be 2.41 to 2.5 volts.

In the fourth charge stage following the third charge stage, a fourth charge power having a fourth charge current in pulse form with the first frequency and a fourth charge voltage is applied to charge the at least one battery. The fourth current in the fourth charge stage decreases gradually, the fourth charge voltage remains a second constant voltage CV2 is higher than the first constant voltage CV1 in the second charge stage.

In the above mentioned embodiments, the charge current is the chare stages are pulse form. For Lead Acid batteries, in the first to fourth charge stage, the charge current applied in pulse form may reduce the generation of Lead Sulfate on the electrodes of batteries, and the energy is easy to charge into the battery. For some other batteries, like silicone power battery, the charge current applied in pulse form may reduce the internal resistance of these batteries, and the energy is easy to charge into the battery.

Figure 5:
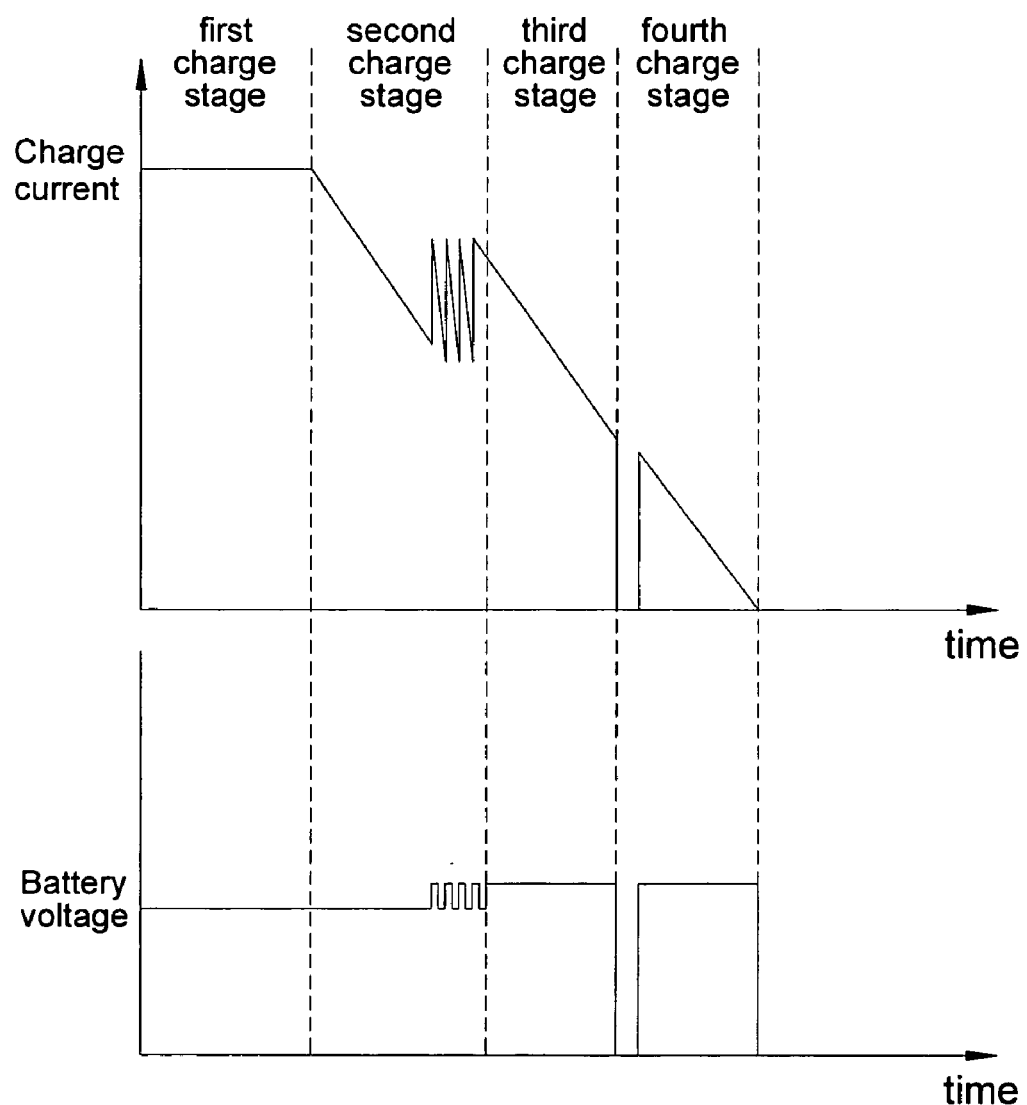
FIG. 5 illustrates another embodiment in accordance with the charge topology of the invention.

Alternatively, a variant current in pulse form with a second frequency between the second charge stage and the third charge stage is optionally applied, as illustrated in FIG. 5. The second frequency may optionally be 10 Hz~20 Hz. The charge voltage in this stage varies with the second frequency. The variant current may prevent damage of the battery during charge and reduce charge time. The second frequency is smaller than the first frequency.

Alternatively, a step of suspending charge of the at least one battery for a predetermined time, such as 45 seconds, is employed between the third charge stage and the fourth charge stage, as illustrated in FIG. 4 and FIG. 5. The virtual potential of the battery may be detected by suspending charge. In the circuitry, it may be detected by a dummy load, such as fan.

Alternatively, after the battery is very close to full charge, a maintenance stage following the fourth charge stage is continued, as illustrated in FIG. 4 and FIG. 5. In the maintenance stage, a fifth current is applied to maintain the battery until the battery is substantially full charged.

Figure 6:
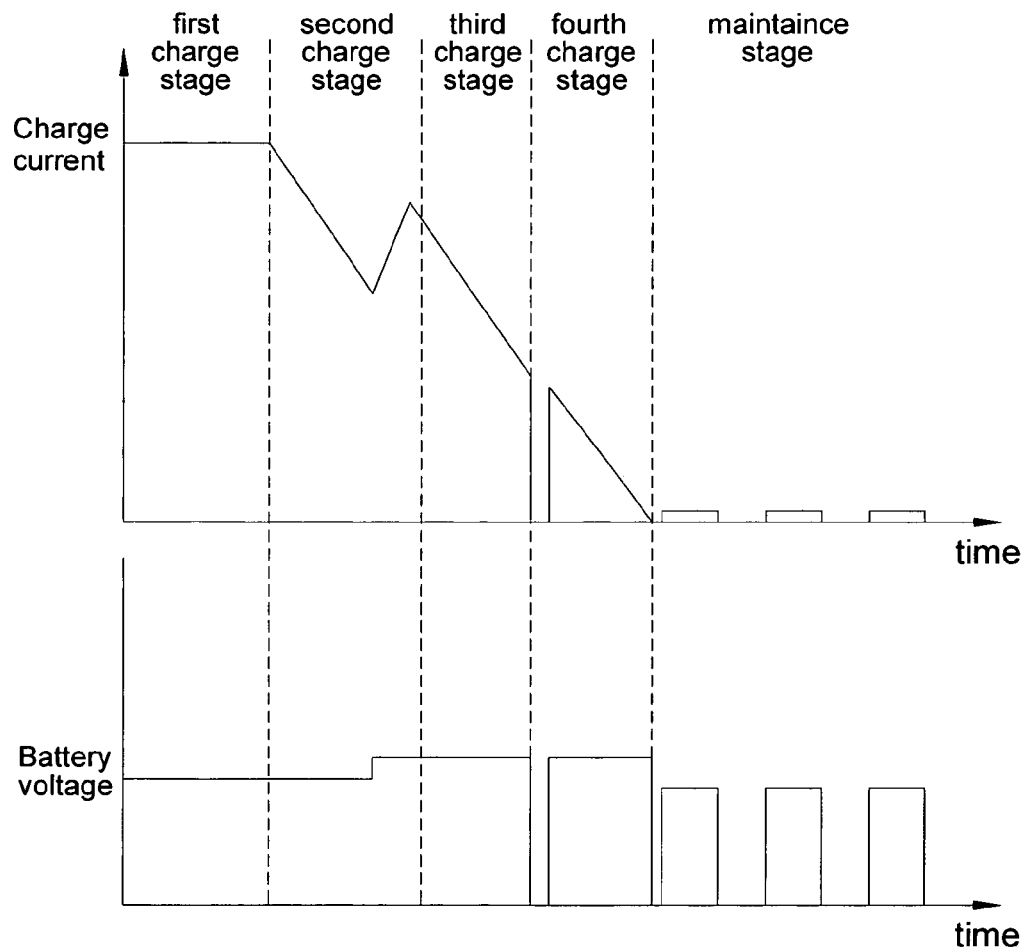
FIG. 6 illustrates another embodiment in accordance with the charge topology of the invention.
Figure 7:
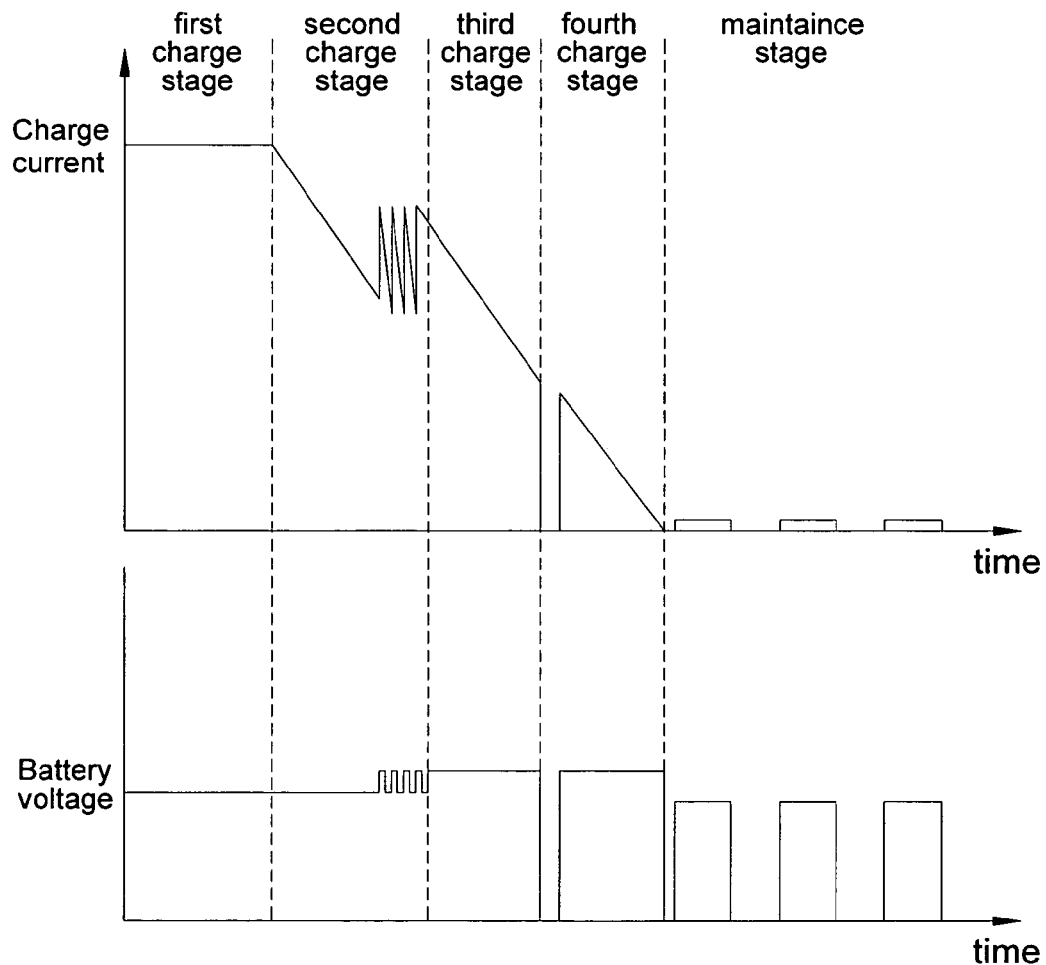
FIG. 7 illustrates another embodiment in accordance with the charge topology of the invention.

Alternatively, in the maintenance stage, as illustrated in FIG. 6 and FIG. 7, when the battery voltage of the battery is lower than a predetermined voltage, the fifth current is applied again to the battery for remaintain the at least one battery.

Alternatively, in the maintenance stage, when the battery voltage of the battery is lower than a predetermined voltage, a sixth current which is different from the fifth current is applied to recharge the at least one battery.

Figure 8:
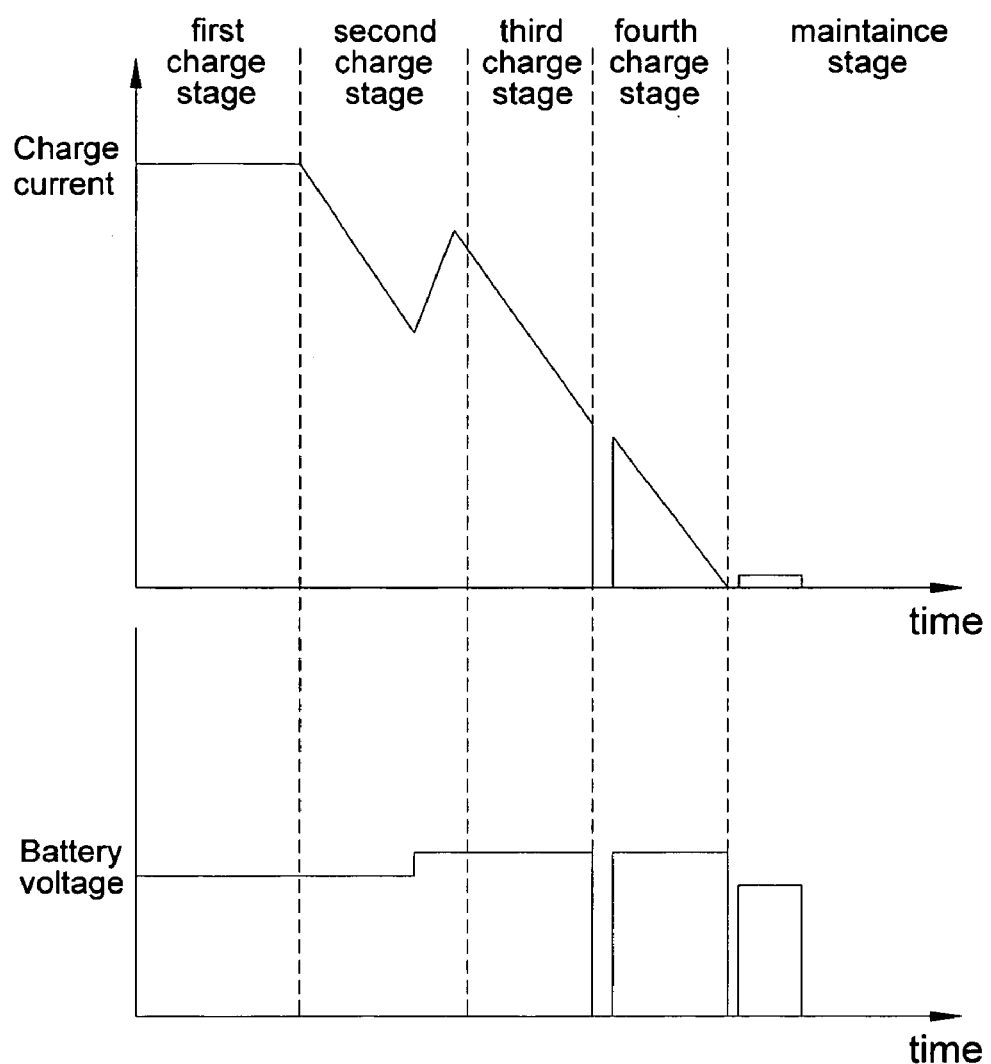
FIG. 8 illustrates another embodiment in accordance with the charge topology of the invention.
Figure 9:
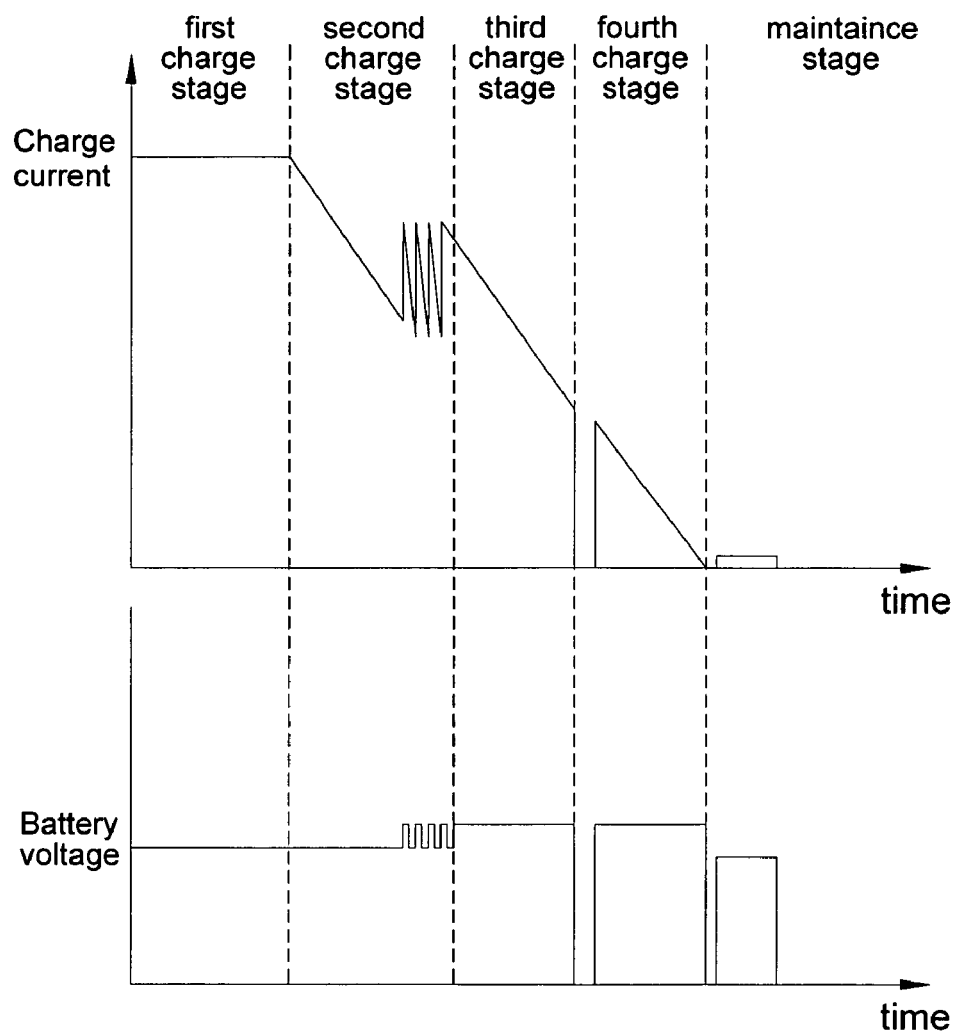
FIG. 9 illustrates another embodiment in accordance with the charge topology of the invention.

Alternatively, in the maintenance stage, as illustrated in FIG. 8 and FIG. 9, when the battery voltage of the battery is lower than a predetermined voltage, the fifth current is applied again to the battery for remaintain the at least one battery. In this embodiment, the fifth current is applied for one time.

Also in this embodiment as illustrated in FIG. 8 and FIG. 9, in the maintenance stage, when the battery voltage of the battery is lower than a predetermined voltage, a sixth current which is different from the fifth current is applied to recharge the at least one battery.

As illustrated in previous figures, the battery voltage is lower than the second voltage CV2. Alternatively, the battery voltage is the same as the second voltage CV2.

Figure 10:
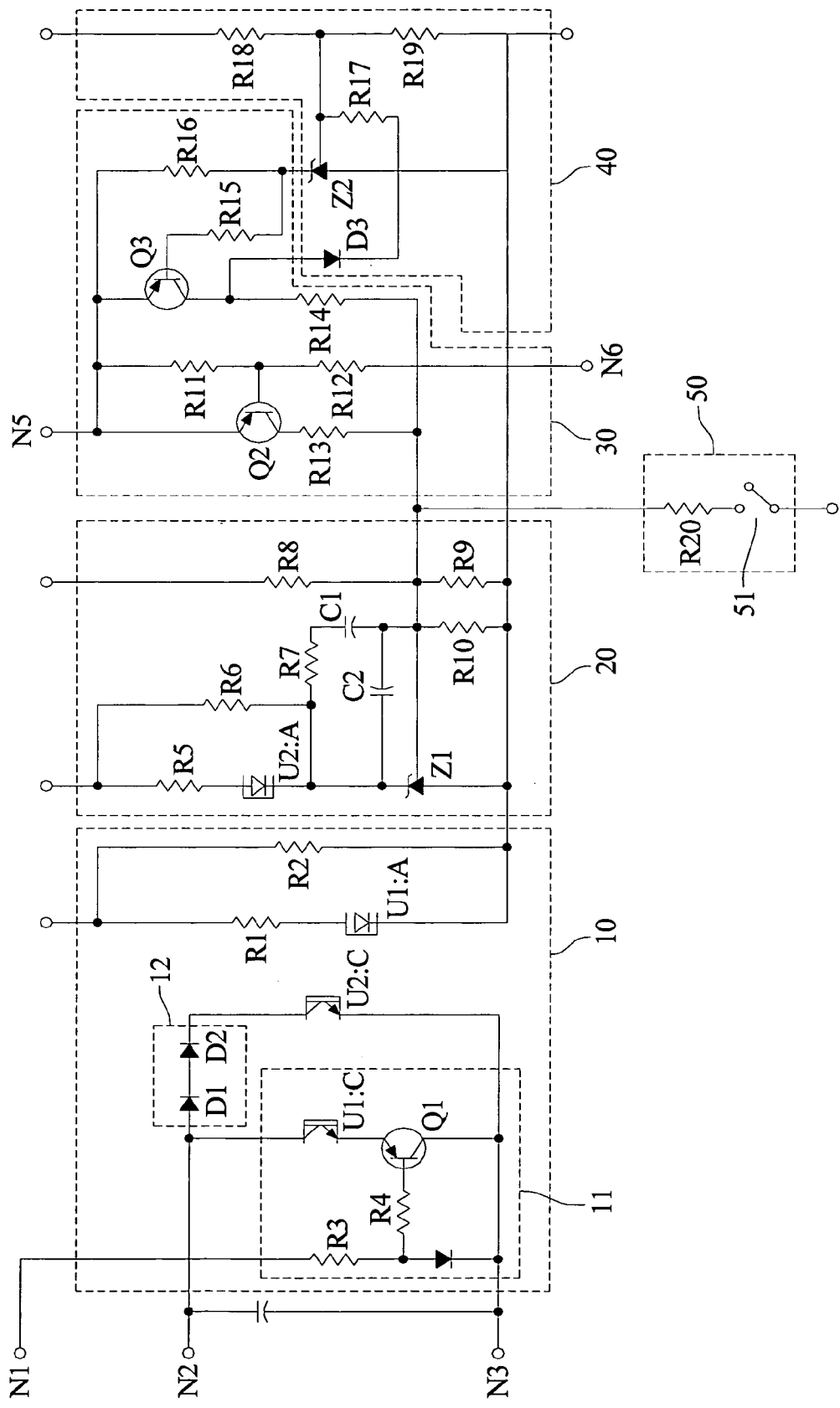
FIG. 10 illustrates an embodiment of a charge circuitry in accordance with the charge topology of the invention.

FIG. 10 illustrates an embodiment of a circuitry in accordance with the charge topology of the invention. The charge circuit in FIG. 10 includes a first current generating circuit 10, a control circuit 20 for controlling a microprocessor, a voltage generating circuit 30 for generating a constant voltage, and a second current generating circuit 40. In this circuit, the integrated circuit (IC) is arranged at the primary side of the transformer, therefore, separated element are necessary in this circuit.

According to the charge topology of the embodiments, In the first charge stage, a first charge power having a first charge current in pulse form with a first frequency, for example and a first charge voltage is applied to charge the at least one battery. The first current generating circuit 10 generates a first charge current in pulse form with a first frequency. The first frequency, for example, may be 100 Hz to 120 Hz. The first current generating circuit 10 is connected to and controlled by a microprocessor (not shown) such that the first charge current is generated in pulse form with the first frequency.

In one embodiment, a first resistor R1 and a first LED U1:A is included in the first pulse generating circuit 10. An additional resistor R2 may be optionally connected with the first resistor R1 and the first LED U1:A in parallel.

In one embodiment, when the battery voltage is higher than the voltage provided by the charging circuit, a control circuit 11 is provided to supply a small power source to the microprocessor to prevent shut down of the microprocessor. Two resistors R3, R4 connected in series are provided in the control circuit 11. One terminal of the resistor R3 is connected to a first node N1 for receiving a reference voltage. The base of the first transistor Q1 is connected to the resistor R4. The emitter of the first transistor Q1 is connected to a terminal of a first phototransistor U1:C (of a first optocoupler), while the collector of the first transistor Q1 is connected to a third node N3. The second node N2 and the third node N3 may connect to an integrated circuit. A pulse provider 12 with minimum duty is provided to the control circuit 12 by having two diodes D1, D2 connected in series. A second phototransistor U2:C is also provided in the first pulse generating circuit 10. A terminal of a second phototransistor U2:C (of a second opto-coupler) is connected to the diode D2, while another terminal of the second phototransistor U2:C is connected to the second node N3 (and the collector of the first transistor Q1).

The first current generating circuit 10 generates the first charge current in pulse form with the first frequency in the first charge stage. In this stage, the first charge current in the first charge stage remains substantially constant; the first charge voltage remains a first constant voltage. Therefore, the first charge current in pulse form remains substantially constant. The first charge voltage is controlled by a voltage generating circuit 20.

In the voltage generating circuit 20, a terminal of a second LED U2:A is connected to the resistor R5. The resistors R6, R7 and the capacitors C1, C2 are connected in series for feedback compensation. The resistors R8, R9 connected in series and a Zener diode Z1 are employed for feedback voltage control. The resistor R10 connected in parallel with the resistor R9 is optionally provided to fine tuning the provided current and voltage.

As previously mentioned, in the second charge stage, the charge voltage remains the first constant voltage CV1. In the third charge stage, the third charge voltage remains a second constant voltage CV2 is higher than the first constant voltage CV1 in the second charge stage. In the fourth charge stage, the fourth charge voltage remains a second constant voltage CV2 is higher than the first constant voltage CV1 in the second charge stage. The first constant voltage CV1 and the second constant voltage CV2 are controlled by a voltage control circuit 30.

The fifth node N5 receives the battery voltage. The first constant voltage CV1 and the second constant voltage CV2 are delivered from the sixth node N6. The emitter of the second transistor Q2 is connected to the fifth node N5. The resistors R11, R12 are connected in series. The resistor R13 is connected to the collector of the second transistor Q2. The resistor R14 is connected to the third transistor Q3; the resistor R15 is connected to the base of the second transistor Q2; the resistor R16 is connected to the emitter of the second transistor Q2. When the third transistor Q3 turns on, the first constant voltage CV1 is delivered from the sixth node N6; when the third transistor Q3 turns off, the second constant voltage CV2 is delivered from the sixth node N6.

In a maintenance stage following the fourth charge stage, a fifth current is applied to maintain the battery until the battery is substantially full charged. A fifth voltage corresponding to the fifth current is also generated in the maintenance stage. The fifth voltage, or maintenance voltage is controlled by the voltage control circuit 30. When the third transistor Q3 turns off and the second transistor Q2 turns on, the maintenance voltage is delivered from the sixth node N6.

For prevention damage of the battery during charge and reduction of charge time, a variant current in pulse form with a second frequency between the second charge stage and the third charge stage is optionally applied. The charge voltage in this stage varies with the second frequency. The second frequency is controlled by a second current generating circuit 40. A second Zener diode Z2 is connected to the resistor R16. The resistor R17 is connected with the diode D3 in series. The resistors R18, R19 are connected in series. Through the operation of the diode D3, the resistor R14 and the second Zener diode Z2, the second frequency is thereby delivered.

A detecting circuit 50 having a resistor R20 and a switch 51, such as the diode or transistor, connected in series is alternatively provided. When the switch 51 is on, the circuit is directed to the ground. When the switch is off, the circuit is directed to float. The charge voltage in the battery may be detected through the resistor R20 and the switch.

Figure 11:
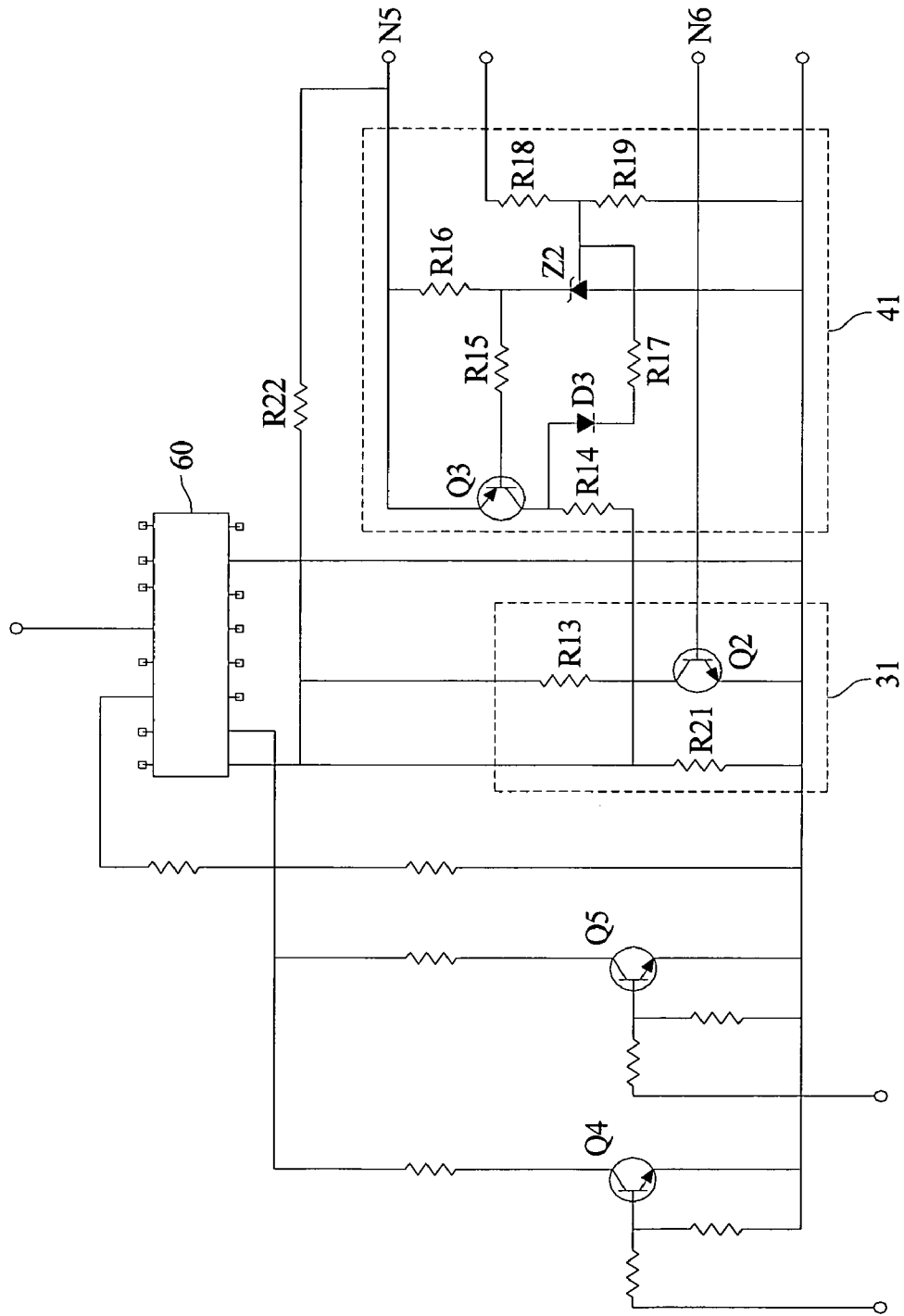
FIG. 11 illustrates another embodiment of a charge circuitry in accordance with the charge topology of the invention.

FIG. 11 illustrates another embodiment of a circuitry in accordance with the charge topology of the invention. The charge circuit in FIG. 11 includes a voltage generating circuit 31 for generating a constant voltage, and a second current generating circuit 41. In this circuit, an integrated circuit (IC) 60 is arranged at the secondary side of a transformer (not shown).

The operation and function of the voltage generating circuit 31 is similar to the voltage generating circuit 30 in the previously mentioned embodiment. The operation and function of the second current generating circuit 41 is similar to the second current generating circuit 40 in the previously mentioned embodiment. The resistor R21, R22 connected in series which is not included in the previously mentioned embodiment is arranged in the voltage generating circuit 31.

In the second charge stage, the charge voltage remains the first constant voltage. In the third charge stage, the third charge voltage remains a second constant voltage is higher than the first constant voltage in the second charge stage. In the fourth charge stage, the fourth charge voltage remains a second constant voltage is higher than the first constant voltage in the second charge stage. The first constant voltage and the second constant voltage are controlled by a voltage control circuit 31.

The fifth node N5 receives the battery voltage. The first constant voltage and the second constant voltage are delivered from the sixth node N6. The resistor R15 is connected to the base of the third transistor Q3. The resistor R16 is connected to the resistor R15. The resistor R14 is connected to the collector of the third transistor Q3. The collector of the transistor Q2 is connected to the fifth node N5 though the resistors R13, R22 connected in series. One terminal of the transistor R21 is connected to the collector of the transistor Q2, and the other one is connected to the emitter of the transistor Q2

When the third transistor Q3 turns on, the first constant voltage is delivered from the sixth node N6; when the third transistor Q3 turns off, the second constant voltage is delivered from the sixth node N6.

The second frequency is controlled by a second current generating circuit 41. A Zener diode M3 is connected to the resistor R16. The resistor R17 is connected with the diode D3 in series. The resistors R18, R19 are connected in series.

In a maintenance stage following the fourth charge stage, a fifth current is applied to maintain the battery until the battery is substantially full charged. A fifth voltage corresponding to the fifth current is also generated in the maintenance stage. The fifth voltage, or maintenance voltage is controlled by the voltage control circuit 31. When the third transistor Q3 turns off and the transistor Q2 turns on, the maintenance voltage is delivered from the sixth node N6.

The transistor Q4, the transistor Q5 and the additional resistors are employed for a voltage divider for the integrated circuit 60.

Now refer to FIG. 12~FIG. 23 illustrating the flow executed by the microprocessor operating in the charge circuit illustrated above.

Figure 12:
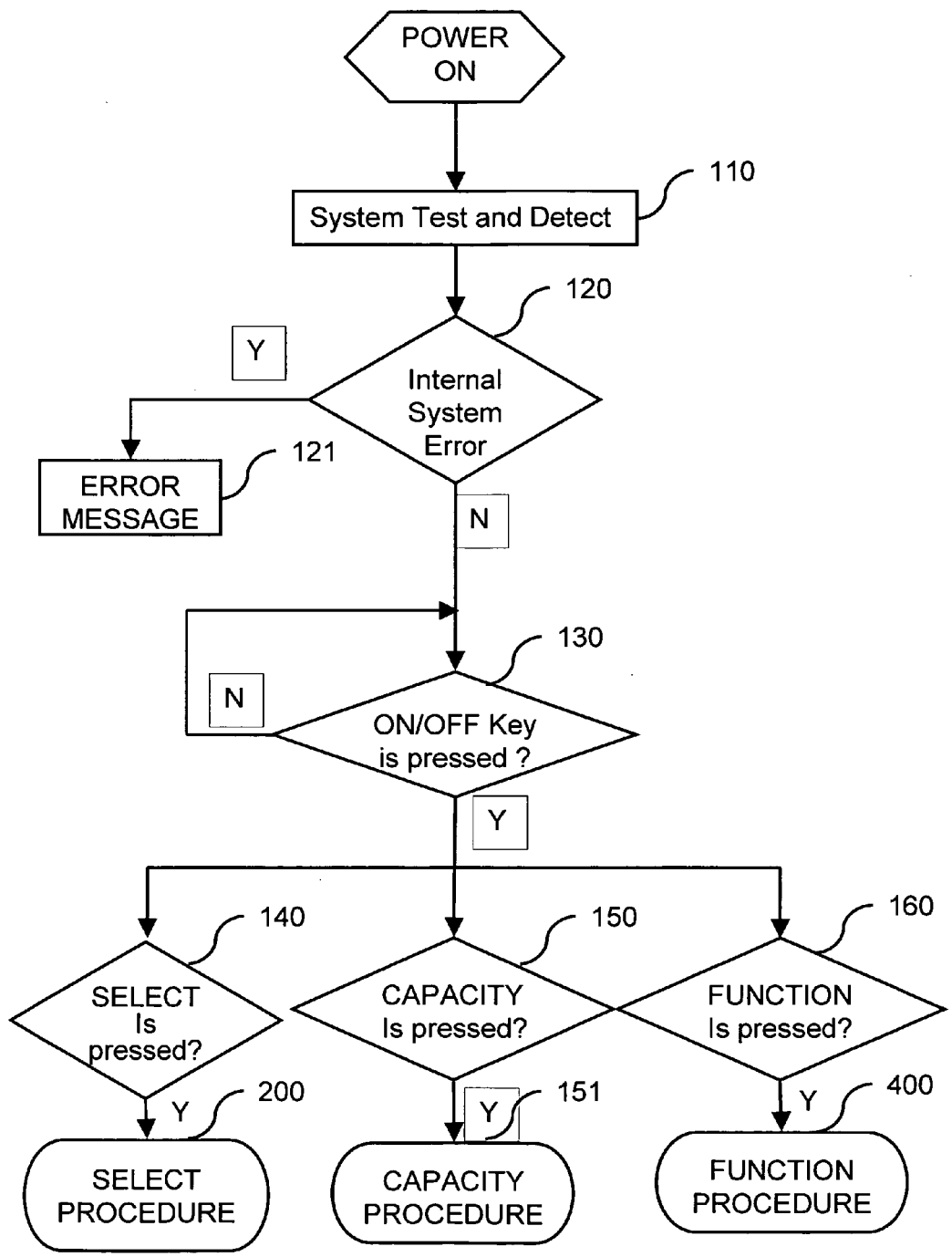

FIG. 12 illustrates the process when the charge system is turned on. The charge circuit is optionally arranged within a case. An interface having a plurality of control buttons for control different function is arranged on the case. The charge system also has a microprocessor executing the specific function when a corresponding control button is pressed. The charge system is provided with a plug which receives electrical power source delivered to the charge system. When the plug receives power source, a testing program checks and tests the charge system and the operation of the buttons (step 110). If any defects are detected in the charge system or the buttons (step 120), an error message is shown on a display provided on the case (step 121). In step 120, if the charge system does not connect with a battery, the error message is also shown on the display to notify the disconnection between the charge system and the battery.

An ON/OFF button is also provided on the case. The system detects the ON/OFF button is pressed or not automatically (step 130).

In this embodiment, there are four operation buttons optionally provided on the case. Each button executes a specific function when the operation button is pressed. When the SELECT button is pressed (step 140), the microprocessor controls the charge circuit and the energy is delivered into the battery for charge. There is a plurality of charge modes provided to be selected by the user. The user may press the SELECT button to select a predetermined charge mode for charge, and then a charge procedure corresponding to the selection from the user is executed and controlled by the microprocessor (step 200).

Optionally, a CAPACITY button is also provided. When the CAPACITY button is pressed (step 150), the charge circuit detects the batter voltage (step 151) and the detected voltage is shown on the display.

Optionally, a FUNCTION button is also provided. When the FUNCTION button is pressed (step 160), the charge circuit executes the maintenance procedure or alternator procedure (step 400) which will be given in more details in the following.

Figure 13:
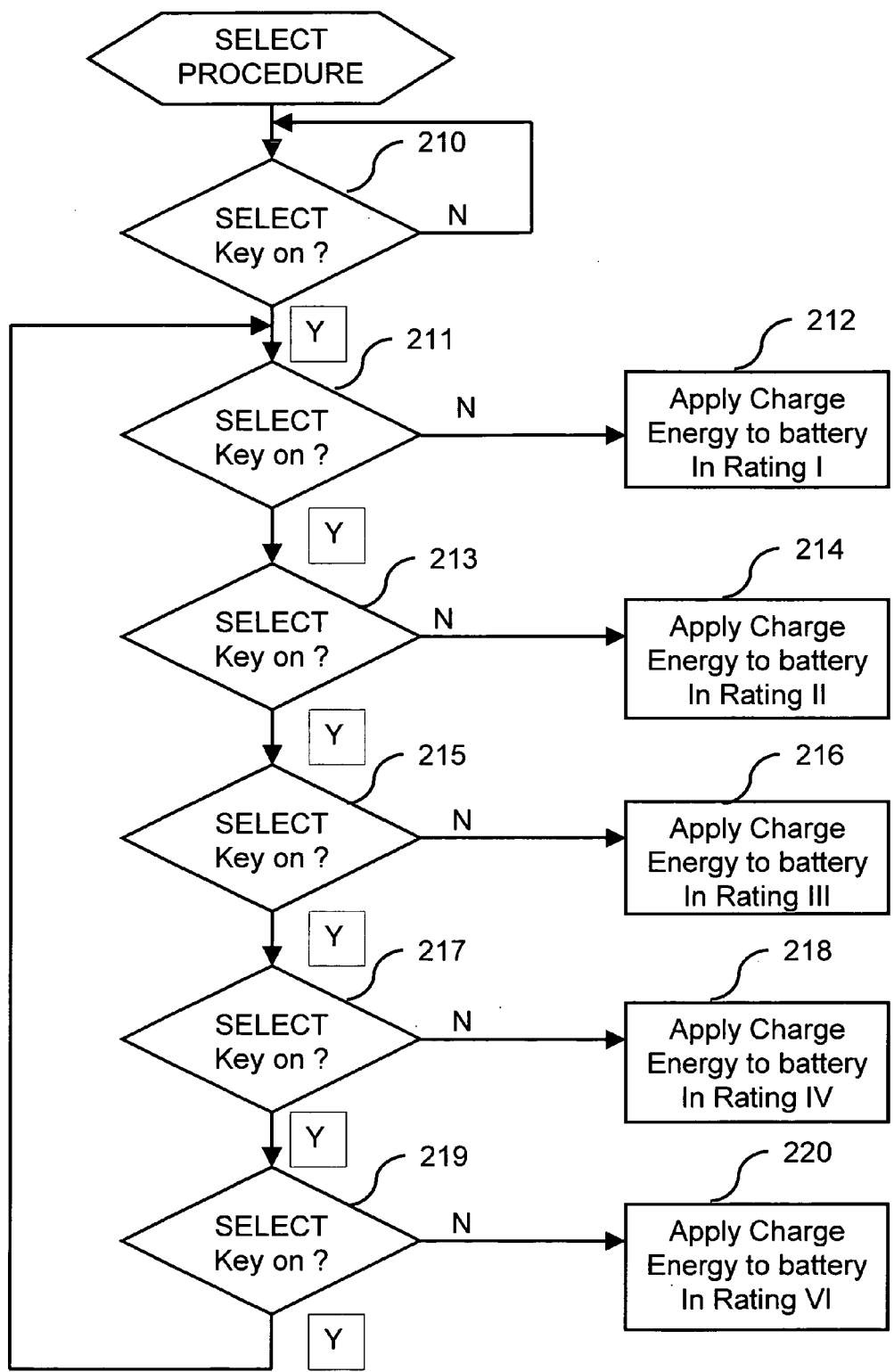
FIG. 13 illustrates the detailed procedure of SELECT procedure when the SELECT button is pressed.

Refer to FIG. 13, which illustrates the detailed procedure of SELECT procedure when the SELECT button is pressed. When the SELECT button is pressed, the microprocessor controls the charge flow into SELECT procedure. In this embodiment, there is a plurality of charge ratings. Each rating is switchable by pressing SELECT button. When a predetermined charge rating is selected, a predetermined charge energy corresponding to the charge rating is delivered to charge the battery.

When the SELECT button is pressed, detection that the SELECT button is pressed again continues (step 210). When the SELECT button is pressed again (step 210), the charge rating switched to rating I (step 212). If the SELECT button is not pressed again (step 211), the microprocessor enables the charge circuit to charge the battery in rating I (step 212). When the SELECT button is pressed again (step 211), the charge rating switched to rating II (step 213). If the SELECT button is not pressed again (step 213), the microprocessor enables the charge circuit to charge the battery in rating I (step 214). The step 215 to 220 executes similar procedures as previously described and thus related illustration is abbreviated for simplification.

Figure 14:
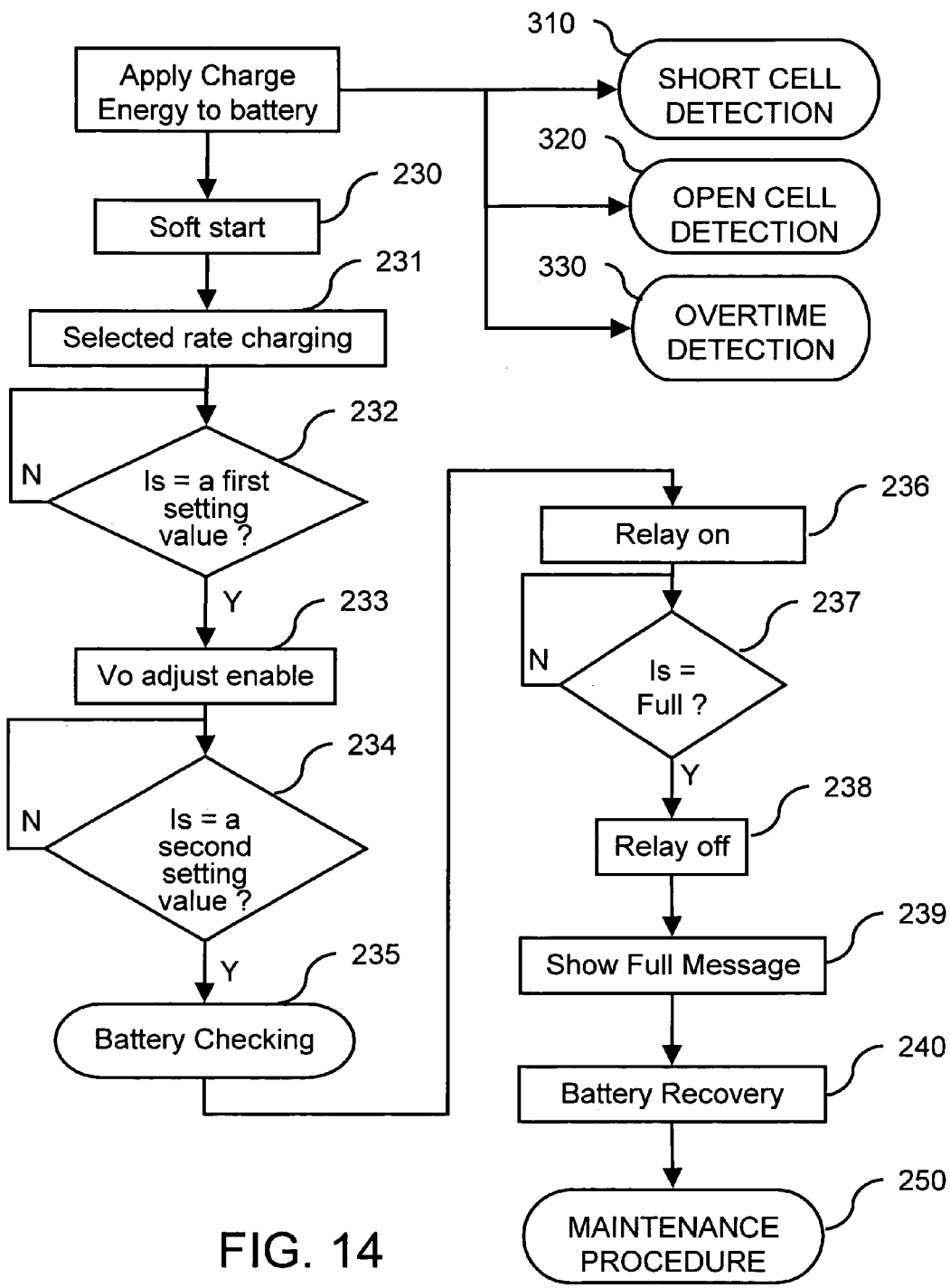
FIG. 14 illustrates the detailed procedures when a specific charge rating is selected.

Refer to FIG. 14 illustrating the detailed procedures when a specific charge rating is selected. When a specific charge rating is selected, the charge circuit delivers a predetermined charge energy corresponding to the charge rating to the battery. The charge circuit enables soft start with a very small current in the beginning (step 230). This feature prevention damage occurred on the battery. After soft start, the charge circuit charge energy into the battery in selected charge rating (step 231). The microprocessor detects the charge current (step 232). If the detected charge current is equal to a first setting value, the charge circuit adjusts the charge voltage from the first constant voltage CV1 to the second constant voltage CV2 (step 233). The charge system then detects if the charge current is equal to a second setting value or not (step 234). If the charge current is equal to the second setting value, the charge system executes a battery check procedures (step 235) which will be given in more details in the following. The charge system then enables the relay in the charge circuit to turn on (step 236). The charge system then detects the battery current is close to full charge or not (step 237). If the battery current is close to full charge, the charge system then enables the relay in the charge circuit to turn off (step 238). Then a full message is showed on the display (step 239). Then the battery recovers for a predetermined time (step 240) and then the charge system executed maintenance procedure (step 250).

Upon the charge system delivers charge energy, the system also executes short cell detection (step 301), open cell detection (step 320) and overtime detection (step 330). In step 301, if any short cell in the battery is detected, the charge system will stop to charge. In step 320, if any open cell in the battery is detected, the charge system will stop to charge. In step 330, if the charge time lasts for a very long time, the charge system will stop to charge automatically.

Figure 15:
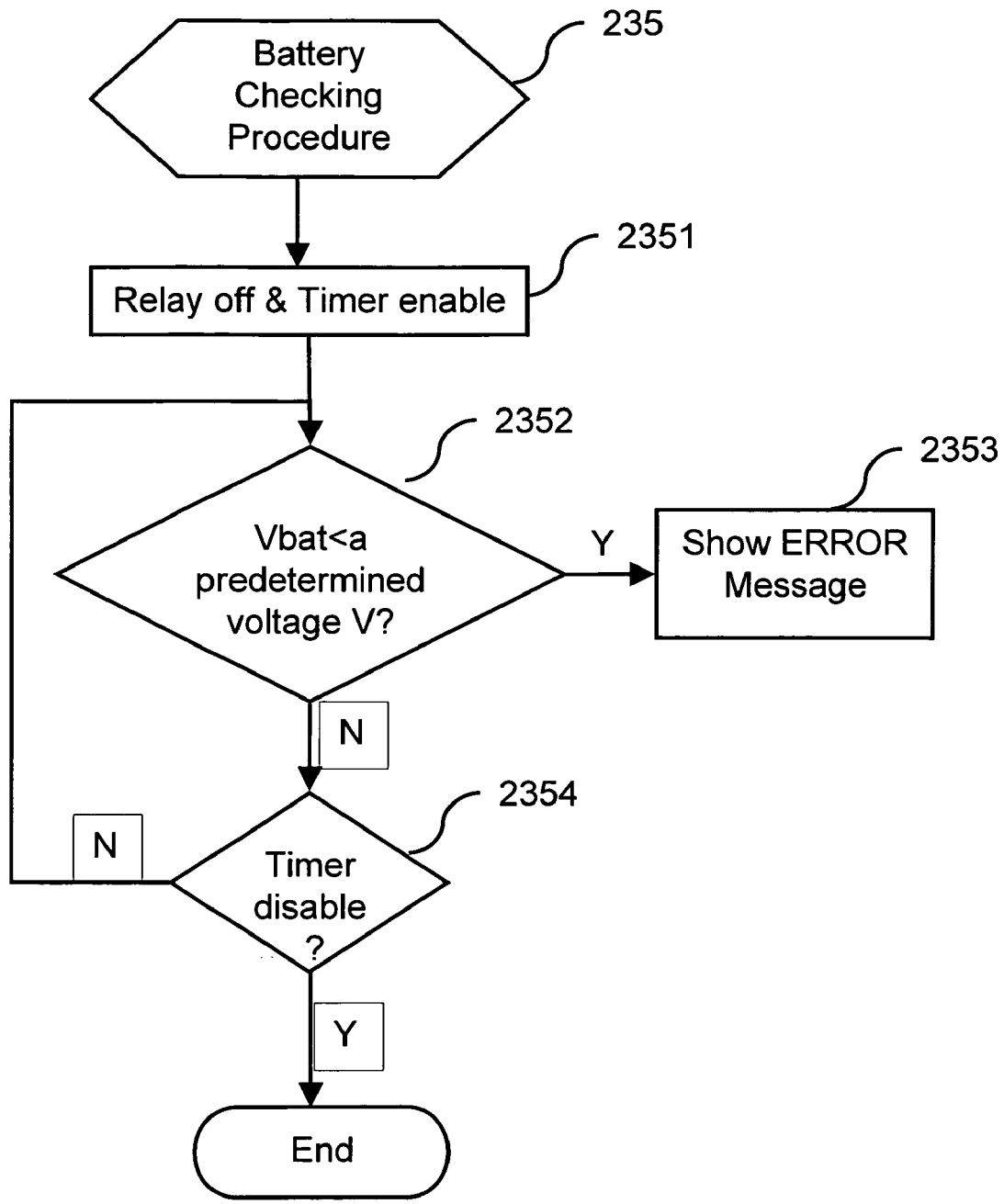
FIG. 15 illustrates the battery check procedures.

Refer to FIG. 15 illustrating the battery check procedures in step 235. In step 2351, the charge system turns the relay one and enables a timer to start counting. Then the charge system detects charge voltage is smaller than a predetermined voltage, for example 12.5 volts, or not (step 2352). If the charge voltage is smaller than the predetermined voltage, there must be some defects in the battery such that the charge energy may not be delivered into the battery. An error message is shown on the display (step 2353) if there are any defects. This check procedure will last for a predetermined time as previously described. If the time is up (step 2354), then the system stops battery check. This procedure is executed between the third charge stage and the fourth charge stage as previously described in FIG. 4. The system executes this procedure by turning a fan or a dummy load.

Figure 16:
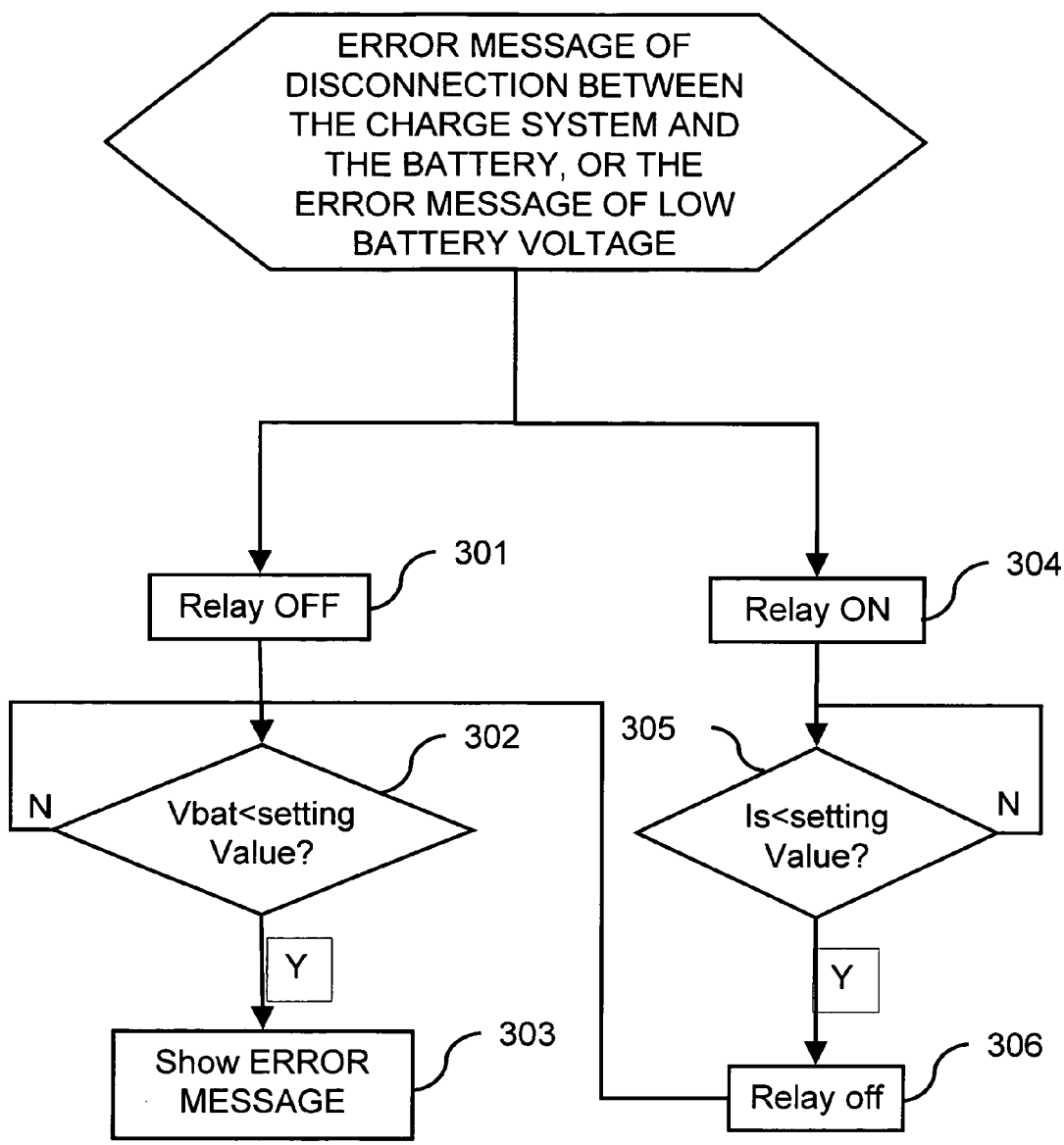
FIG. 16 illustrates the error message of disconnection between the charge system and the battery, or the error message of low battery voltage.

Refer to FIG. 16 illustrating the error message of disconnection between the charge system and the battery, or the error message of low battery voltage. The charge system turns the relay off (step 301). If the battery voltage is lower than a predetermined voltage (step 302), the error message of low battery voltage is shown on the display (step 303). If not, the system continues to detect the battery voltage. When the relay is turned on (step 304), the charge system detects the charge current. If the charge current is lower than a predetermined current (step 305), the charge system turns the relay off (step 306), and executes step 302.

Figure 17:
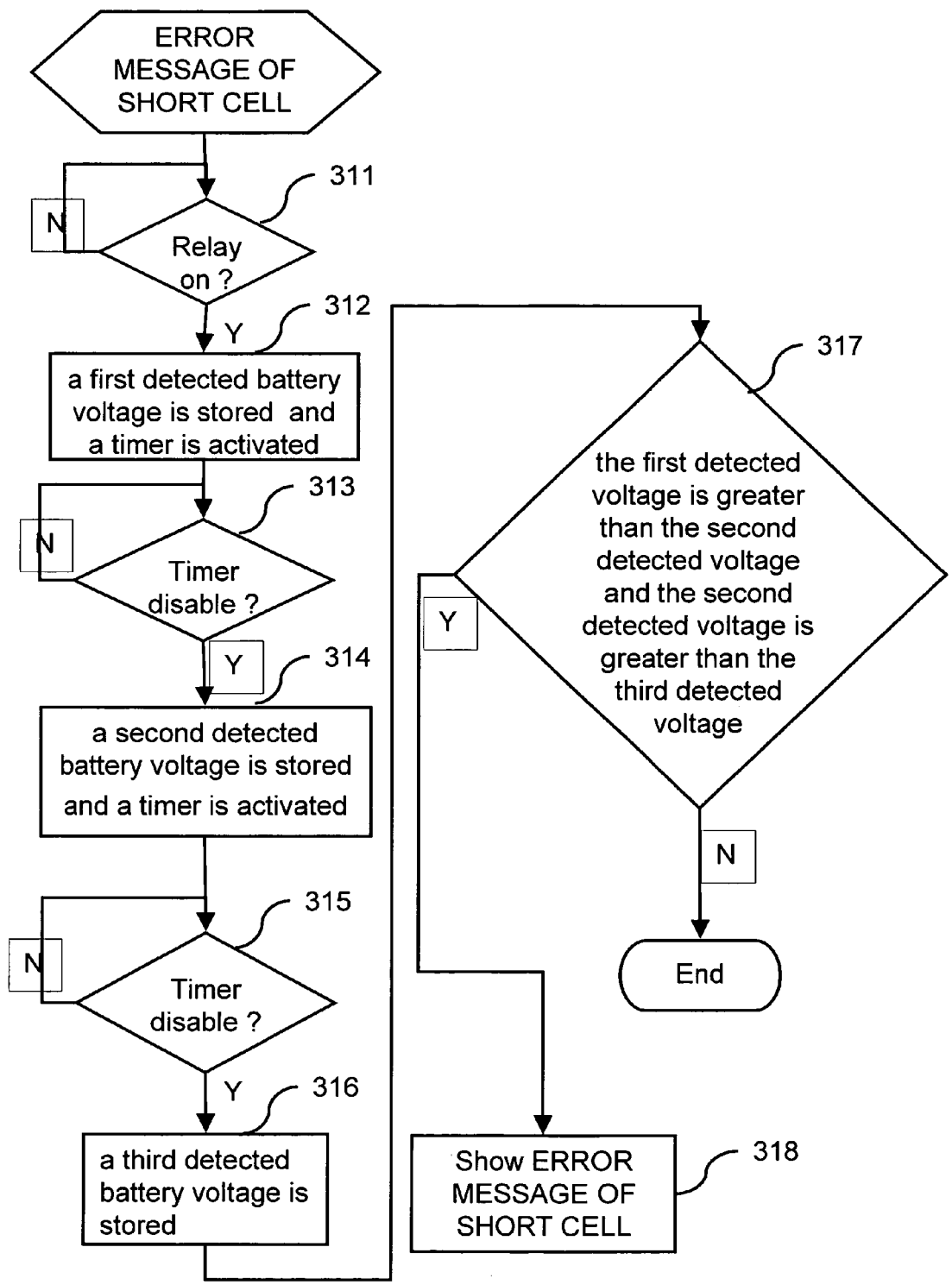
FIG. 17 illustrates the error message of short cell in the battery.

Refer to FIG. 17 illustrating the error message of shorted cell in the battery. The charge system detects shorted cell when the relay turns on (step 311), and a first detected battery voltage is stored (step 312). The timer is also activated for counting. If the relay does not turn on, the charge system will not detect short cell. After counting for a predetermined time and the time is disabled (step 313), a second detected battery voltage is stored (step 314) and the timer is also activated again for counting. After counting for a predetermined time and the time is disabled (step 315), a third detected battery voltage is stored (step 316). If the first detected voltage is greater than the second detected voltage and the second detected voltage is greater than the third detected voltage (step 317), shorted cells exist in the battery. The error message indicating a shorted cell will be shown on the display (step 318).

Figure 18:
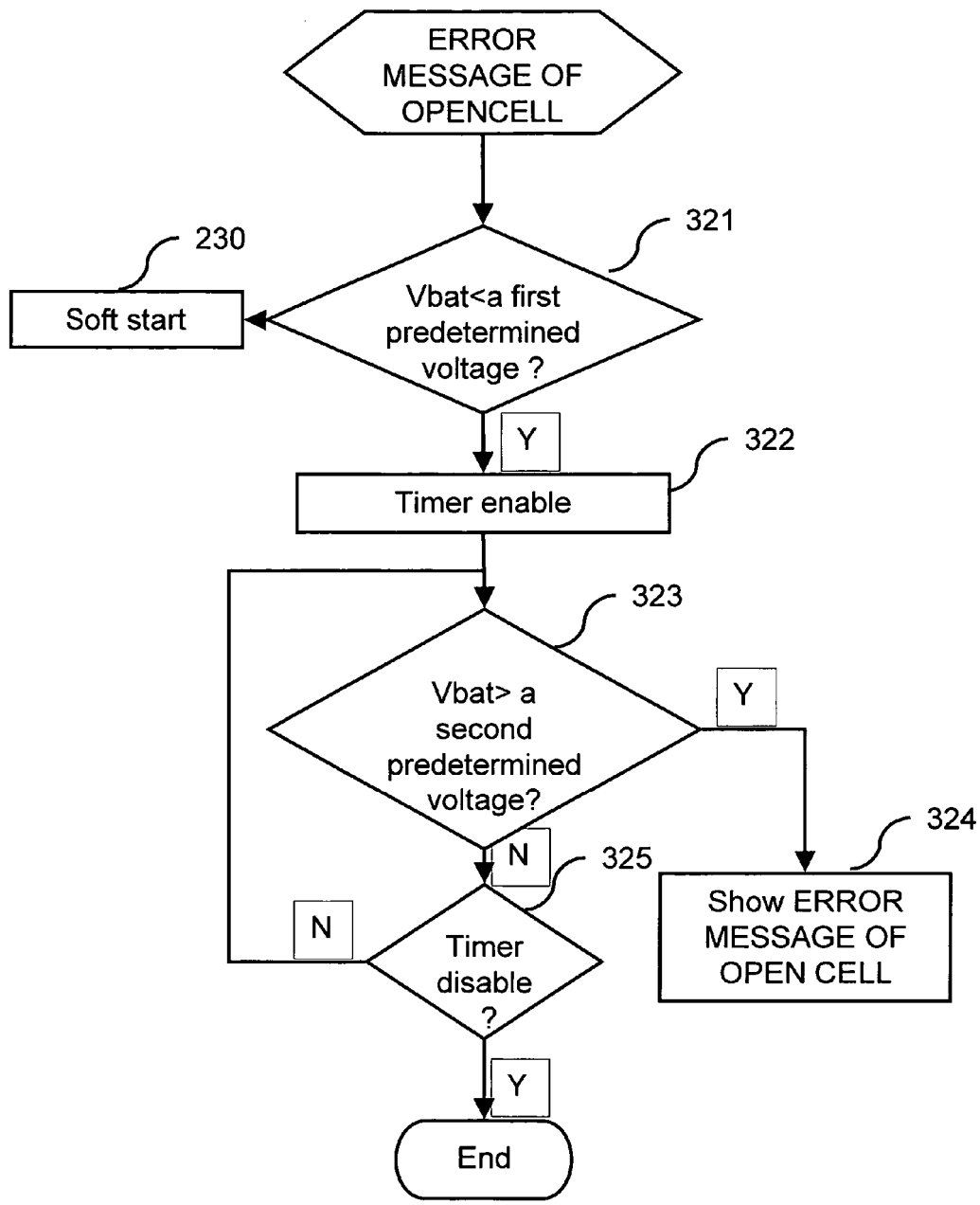
FIG. 18 illustrates the error message of open cell in the battery.

Refer to FIG. 18 illustrating the error message of open cell in the battery. The charge system detects if the battery voltage is smaller than a first predetermined voltage, for example 12 volts (step 321). If it is, a timer is enabled for counting (step 322). If not, then the charge system will softly start the charge procedure (step 230). The charge system then detects if the battery voltage is greater than a second predetermined voltage for example 14.5 volts (step 323). The second predetermined voltage is greater than the first predetermined voltage. If the battery voltage is greater than a second predetermined voltage (step 324), the error message of open cell is shown on the display. If not, the system will check the timer is disabled (step 325). If the timer is not disabled (step 325), the system will detect the battery voltage continuously until the timer is disabled (step 325).

Figure 19:
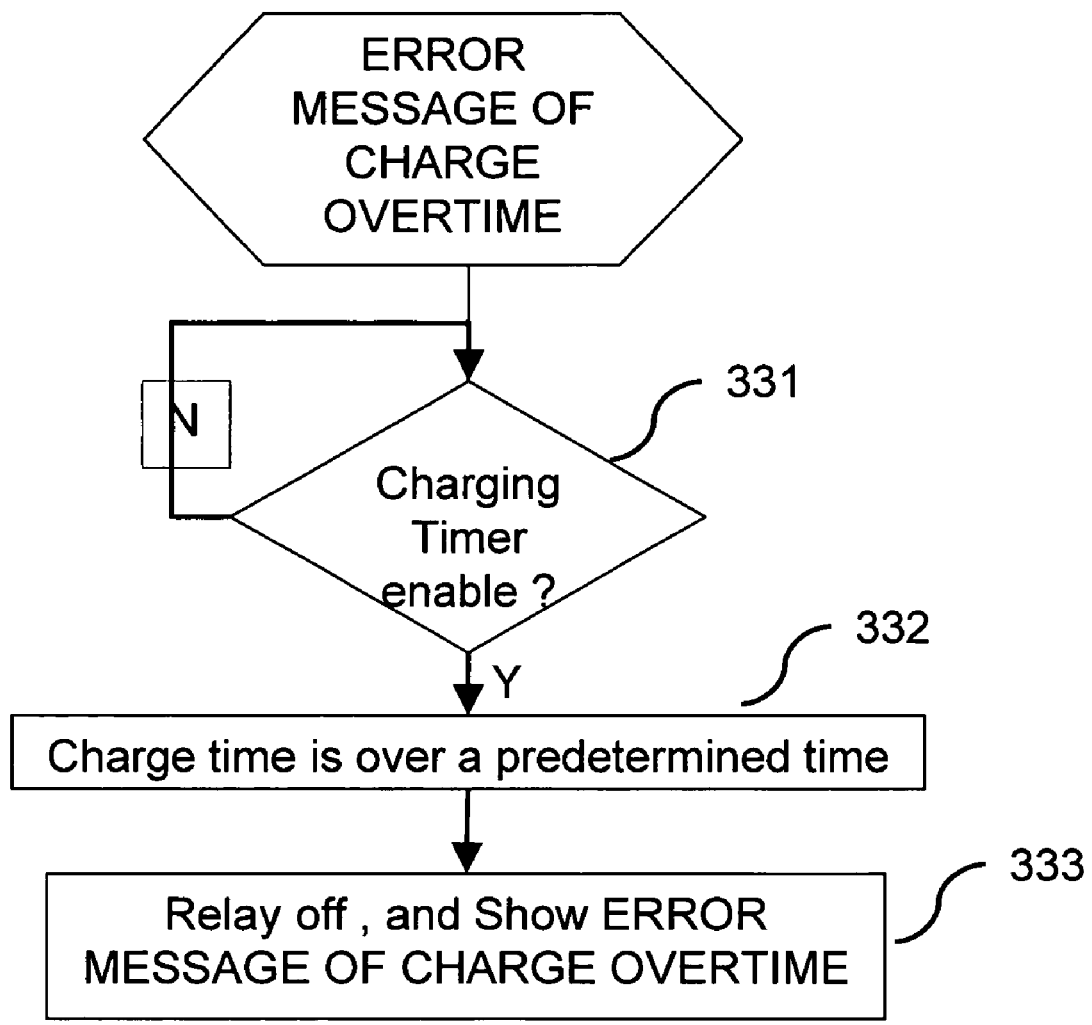
FIG. 19 illustrates the error message of over time charge in the battery.

Refer to FIG. 19 illustrating the error message of over time charge in the battery. The system detects if the charging timer is enabled (step 331). If the timer is activated and the charge time is over a predetermined time (step 332), then the system will turn the relay off and show the error message of over time charge (step 333).

Figure 20:
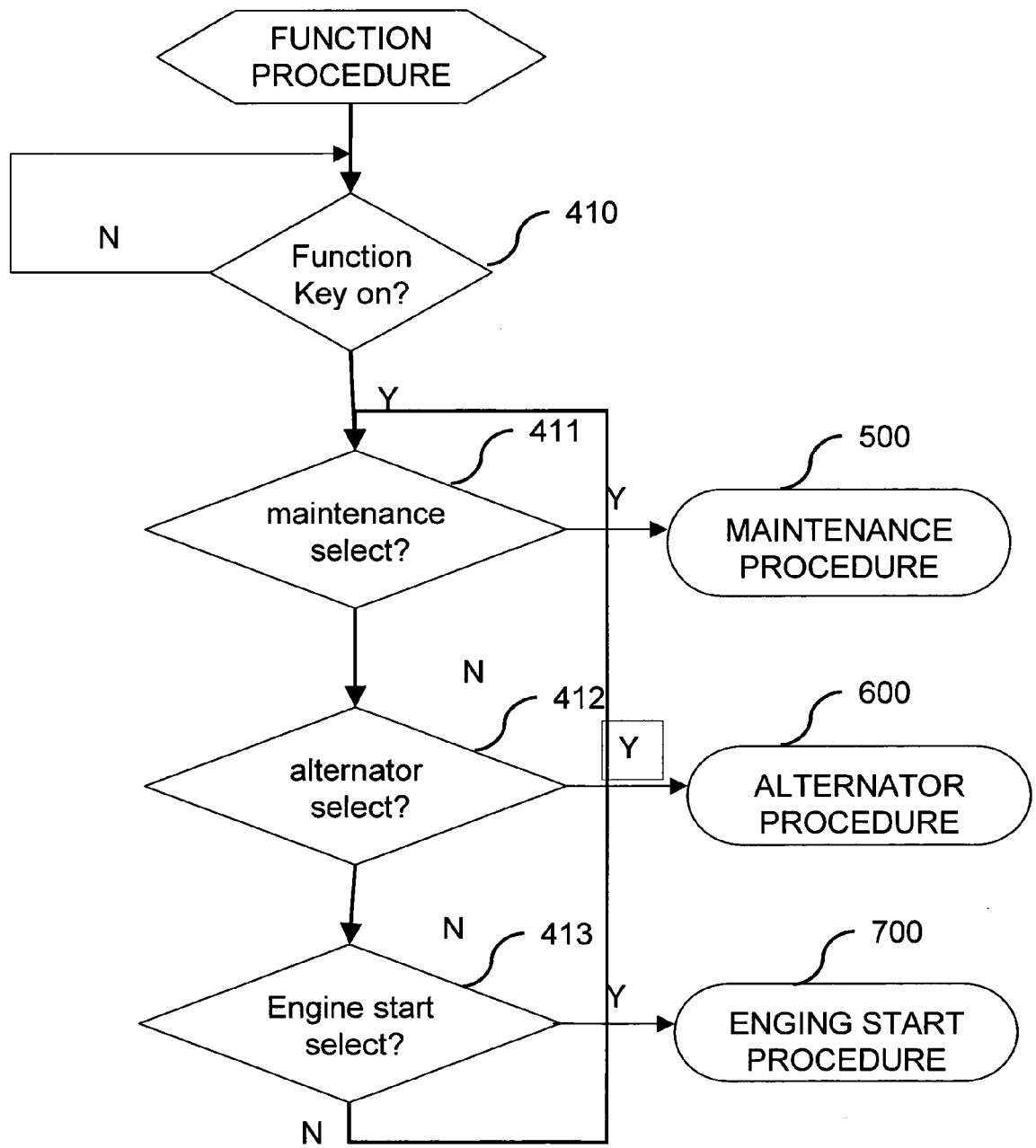
FIG. 20 illustrates the detailed procedures of FUNCTION procedure.

Refer to FIG. 20 illustrating the detailed procedures of FUNCTION procedure. Some specific functions are switchable by pressing the FUNCTION button. When the FUNCTION button is pressed (step 410), the system will then detect if maintenance procedure is selected (step 411). If the maintenance procedure is selected (step 411), the charge system executes the maintenance procedure (step 500) which is given in details in the following. If the maintenance procedure is not selected (step 411), the system will then detect if the alternator is selected (step 412). If the alternator is selected (step 412), the charge system executes the alternator procedure (step 600) which is given in details in the following. If the alternator is not selected (step 412), the system will then detect if the engine start is selected (step 413). If the engine start is selected (step 413), the charge system executes the engine start procedure (step 700).

Figure 21:
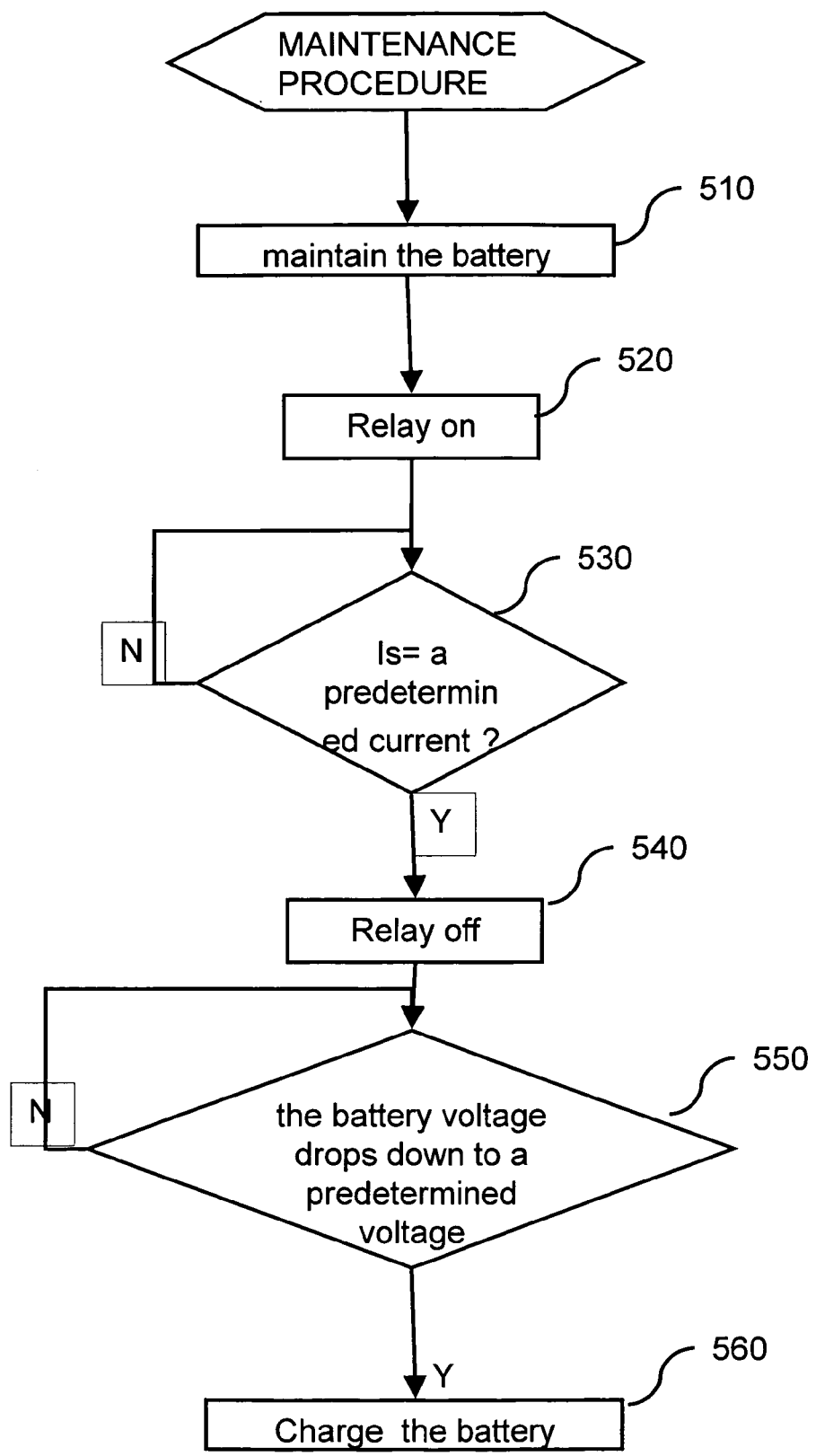
FIG. 21 illustrates the detailed procedures of maintenance procedure.

Refer to FIG. 21 illustrating the detailed procedures of maintenance procedure. When the maintenance procedure is selected, the charge system will maintain the battery. (step 510) and the charge system will turn the relay on (step 520). If the battery current is equal to a predetermined current in the maintenance stage (step 530), the charge system will turn the relay off (step 540). If it is not, the charge system will continue to detect the battery current until it is equal to a predetermined current. When the battery voltage drops down to a predetermined voltage (step 550), the charge system will automatically charge the battery (step 560).

Figure 22:
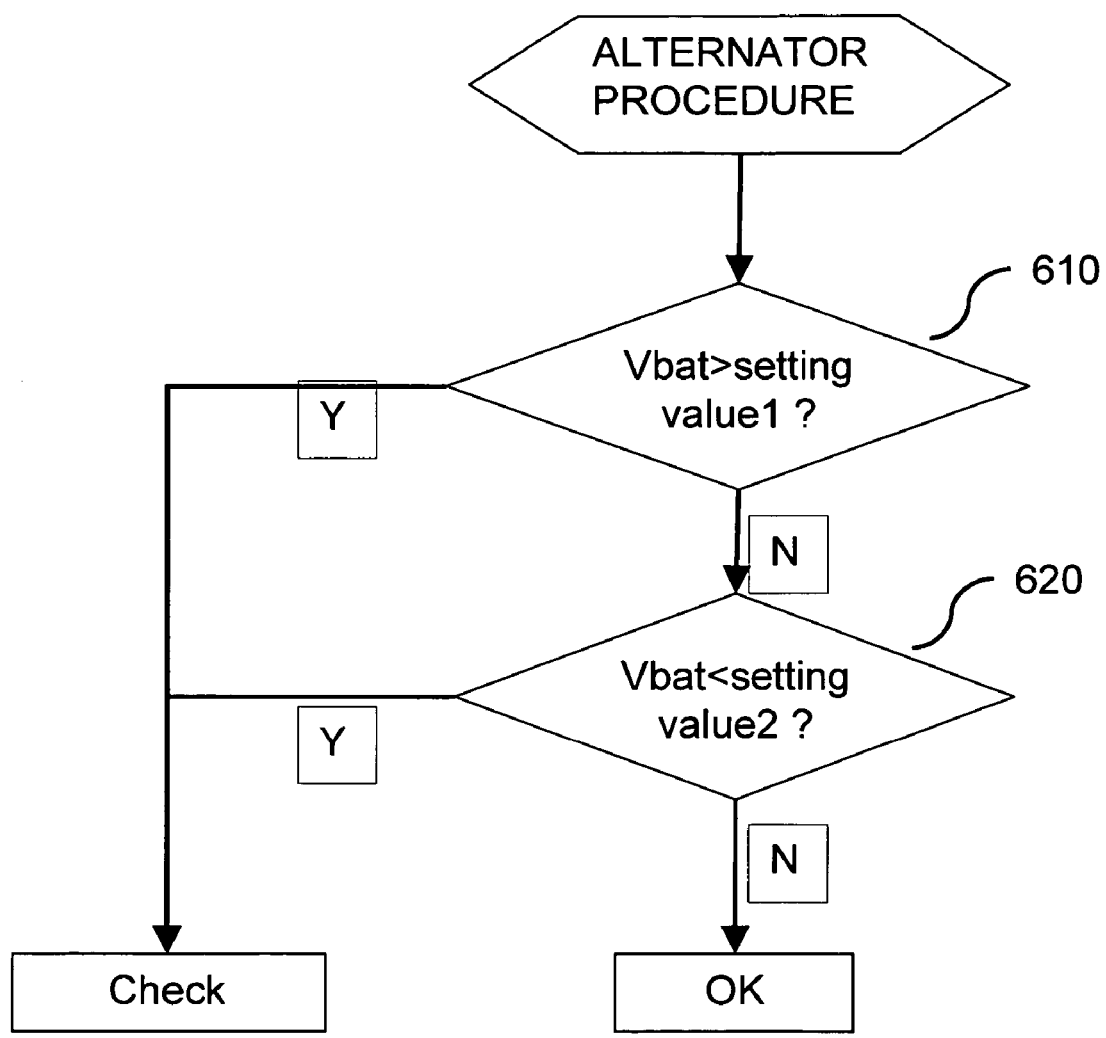
FIG. 22 illustrates the detailed procedures of alternator procedure.

Refer to FIG. 22 illustrating the detailed procedures of alternator procedure. If the voltage in the battery is higher than that of an external system not the charge system, the battery in this situation is like an alternator. The charge system first checks if the battery voltage is greater than a first predetermined setting voltage (step 610). If it is not, the charge system then checks if the battery voltage is smaller than a second predetermined setting voltage which is smaller than the first predetermined setting voltage (step 620). If it is still not, then the charge system is normal. In step 610 and 620, if the battery voltage is greater than a first predetermined setting voltage or the battery voltage is smaller than a second predetermined setting voltage, the charge system is abnormal.

Figure 23:
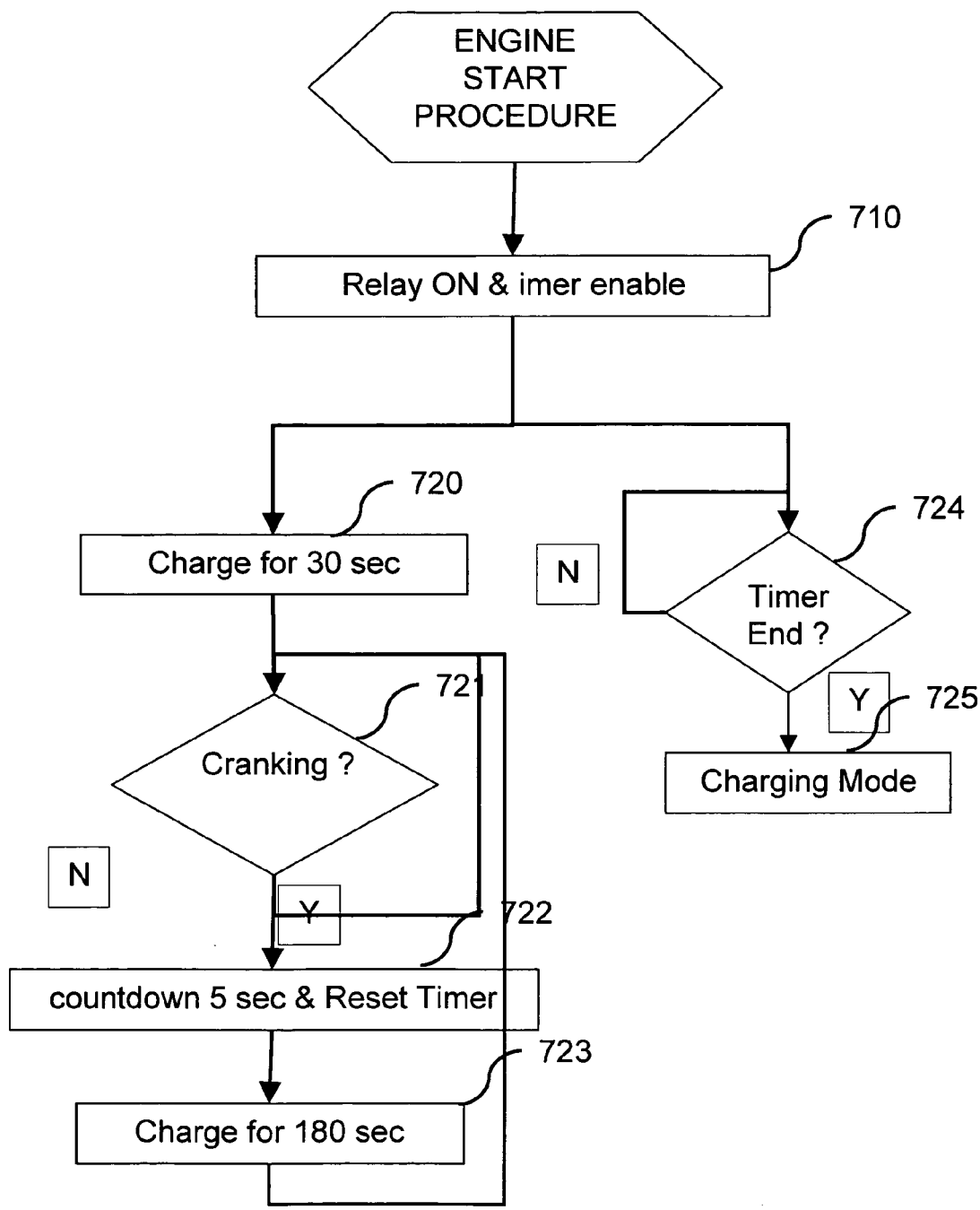
FIG. 23 illustrates the detailed procedures of engine start procedure.

Refer to FIG. 23 illustrating the detailed procedures of engine start procedure. When the engine start procedure is selected, the charge system turns the relay on and enables a timer for counting (step 710). The charge system charges the battery for a short time, for example, 30 seconds. Then the battery may be employed to crank an automobile (step 721). If the automobile is cranked, the timer counts for 5 seconds and the charge system resets timer (step 722). Then the charge system charges the battery for a longer time for next cranking (step 723). Meanwhile, if the timer counts to the end (step 724) and the cranking is not proceeded, the charge system will automatically charge the battery (step 725).

According to the embodiments, constant current mode and constant voltage mode are employed during the charge process of batteries. The output voltage employed to charge the batteries can be controlled precisely. Further if the energy stored in the batteries decreases to a predetermined level after full charge, the disclosed charge method and circuit may apply a current to maintain the batteries automatically such that the batteries may remain full charge.

Figure 24:
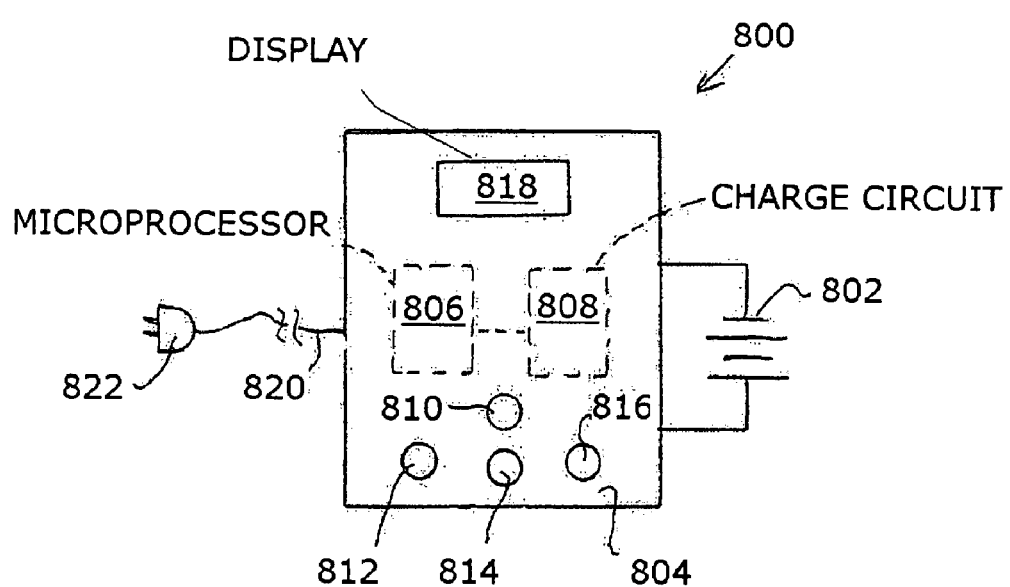
FIG. 24 schematically illustrates a top plan view of a charge system in accordance with the present invention.

An embodiment of a charge system 800 for charging a battery 802 is shown schematically in FIG. 24. The system 800 includes a housing 804 that encloses the electronics of the system, including a microprocessor 806 and a charge circuit 808 in accordance with FIG. 10 or FIG. 11. An on/off button 810, a select button 812, a capacity button 814, and a function button 816 are mounted on the top panel of the housing 804, as is a display 818. The charge system 800 receives power from an electrical outlet (not shown) via a power cord 820 and a plug member 822 that plugs into the outlet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charge circuit for charging at least one battery comprising:
   a first current generating circuit for generating a first charge power having a first charge current in pulse form with a first frequency and a first charge voltage to charge the at least one battery, wherein the first charge current in the first charge stage remains substantially constant, and the first charge voltage remains a first constant voltage;
   a voltage generating circuit connected to the first current generating circuit for controlling the first charge power;
   a voltage control circuit connected to the voltage generating circuit for generating a first constant voltage or a second constant voltage; and
   a second current generating circuit connected to the voltage generating circuit for generating a variant power comprising a variant current in pulse form with a second frequency, wherein a charge voltage included in the variant power varies with the second frequency,
   wherein the voltage control circuit comprises:
      a second transistor and a third transistor;
      an eleventh resistor and a twelfth resistor connected in series;
      a thirteenth resistor having a terminal that is connected to the second transistor;
      a fourteenth resistor connected to the third transistor;
      a fifteenth resistor is connected to the second transistor; and
      a sixteenth resistor is connected to the second transistor;
   wherein when the third transistor turns on, the first constant voltage is generated, and when the third transistor turns off, the second constant voltage is generated.

2. The circuit of claim 1, wherein the first current generating circuit comprises: a first opto-coupler and a first resistor connected to the first opto-coupler.

3. The circuit of claim 2, wherein the first current generating circuit further comprises a microprocessor and a control circuit to supply a small power source to the microprocessor to prevent shut down of the microprocessor, and the control circuit comprises a third resistor, a fourth resistor connected to the third resistor, and a first transistor having a base connected to the third resistor, and an emitter connected to a terminal of the first opto-coupler.

4. The circuit of claim 3, wherein the first current generating circuit further comprises a pulse provider connected to the control circuit, the pulse provider comprising two diodes connected in series.

5. The circuit of claim 1, wherein the voltage generating circuit comprises:
   a second opto-coupler;
   a fifth resistor connected to the second opto-coupler;
   a series circuit for feedback compensation, the series circuit including a sixths resistor, a sevenths resistor, a first capacitor, and a second capacitor, wherein the sixth resistor has a terminal that is connected to a terminal of the fifth resistor;
   eighth and ninth resistors connected in series; and
   a first Zener diode connected with the ninth resistor in parallel for feedback voltage control.

6. The circuit of claim 5, wherein the voltage generating circuit further comprises a tenth resistor connected in parallel with the ninth resistor.

7. The circuit of claim 1, wherein the second current generating circuit comprises:
   a second Zener diode connected to the sixteenth resistor;
   a third diode connected to the second Zener diode;
   a seventeenth resistor connected with the third diode in series; and
   eighteenth and nineteenth resistors that are connected in series, wherein the seventeenth resistor has a terminal that is connected between the eighteenth resistor and the nineteenth resistor.

8. A charge system for charging at least one battery, comprising:
   a panel provided with a plurality of control buttons, each of which corresponds to a respective one of a plurality of specific functions;
   a microprocessor executing the specific functions when the corresponding control buttons are pressed; and
   a charge circuit controlled by the microprocessor for charging the at least one battery, the charge circuit comprising:
      a first current generating circuit for generating a first charge power having a first charge current in pulse form with a first frequency and a first charge voltage to charge the at least one battery, wherein the first charge current in the first charge stage remains substantially constant, the first charge voltage remains a first constant voltage;
      a voltage generating circuit connected to the first current generating circuit for controlling the first charge power;
      a voltage control circuit connected to the voltage generating circuit for generating a first constant voltage or a second constant voltage; and
      a second current generating circuit connected to the voltage generating circuit for generating a variant power comprising a variant current in pulse form with a second frequency, wherein a charge voltage included in the variant power varies with the second frequency,
      wherein the voltage control circuit comprises:
         a second transistor and a third transistor;
         an eleventh resistor and a twelfth resistor connected in series;
         a thirteenth resistor having a terminal that is connected to the second transistor;
         a fourteenth resistor connected to the third transistor;
         a fifteenth resistor is connected to the second transistor; and
         a sixteenth resistor is connected to the second transistor;
      wherein when the third transistor turns on, the first constant voltage is generated, and when the third transistor turns off, the second constant voltage is generated.

9. The system of claim 8, further comprising a plug for receiving electrical power source.

10. The system of claim 8, further comprising a display provided on the panel.

11. The system of claim 8, wherein the microprocessor issues an error message when the charge system does not connect with a battery.

12. The system of claim 8, wherein the microprocessor issues an error message when the charge system detects at least one short cell in the battery.

13. The system of claim 8, wherein the microprocessor issues an error message when the charge system detects at least open short cell in the battery.

14. The system of claim 13, wherein when the battery voltage is smaller than a first predetermined voltage and the battery voltage is greater than a second predetermined voltage, the error message of open cell is generated.

15. The system of claim 8, wherein the microprocessor issues an error message when the charge system charges the battery over a predetermined time.

16. The system of claim 8, wherein the first current generating circuit comprises: a first photodiode; and a first resistor connected to the first photodiode.

17. The system of claim 16 wherein the first current generating circuit further comprises a control circuit to supply a small power source to the microprocessor to prevent shut down of the microprocessor, the control circuit comprises a third and a fourth resistor connected in series; and a first transistor having a base connected to the fourth resistor, a emitter connected to the third terminal of the first photodiode.

18. The system of claim 17, wherein the first current generating circuit further comprises a control circuit to supply a small power source to the microprocessor to prevent shut down of the microprocessor, the control circuit comprises a third and a fourth resistor connected in series; and a first transistor having a base connected to the fourth resistor, a emitter connected to the third terminal of the first photodiode.

19. The system of claim 17, wherein the first current generating circuit further comprises a pulse provider with minimum duty to the control circuit, the pulse provider comprising two diodes connected in series.

20. The system of claim 8, wherein the voltage generating circuit comprises:
   a second opto-coupler;
   a fifth resistor connected to the second opto-coupler;
   a series circuit for feedback compensation, the series circuit including a sixth resistor, a seventh resistor, a first capacitor, and a second capacitor, wherein the sixth resistor has a terminal that is connected to a terminal of the fifth resistor;
   eighth and ninth resistors connected in series; and
   a first Zener diode connected with the ninth resistor in parallel for feedback voltage control.

21. The system of claim 20, wherein the voltage generating circuit further comprises a tenth resistor connected in parallel with the ninth resistor.

22. The system of claim 8, wherein the second current generating circuit comprises:
   a second Zener diode connected to the sixteenth resistor;
   a third diode connected to the second Zener diode;
   a seventeenth resistor connected with the third diode in series; and
   eighteenth and nineteenth resistors that are connected in series, wherein the seventeenth resistor has a terminal that is connected between the eighteenth resistor and the nineteenth resistor.

* * * * *